United States Patent
Lee

(10) Patent No.: US 7,946,005 B2
(45) Date of Patent: May 24, 2011

(54) SAFETY HOOK

(75) Inventor: Ray Lee, Mission Viejo, CA (US)

(73) Assignee: The New Haven Companies, Inc., Fredericksburg, VA (US)

( * ) Notice: Subject to any disclaimer, the term of this patent is extended or adjusted under 35 U.S.C. 154(b) by 804 days.

(21) Appl. No.: 11/811,253

(22) Filed: Jun. 7, 2007

(65) Prior Publication Data

US 2008/0301917 A1    Dec. 11, 2008

(51) Int. Cl.
*A44B 13/02* (2006.01)
(52) U.S. Cl. .............. 24/582.11; 24/599.1; 24/600.9; 24/601.2
(58) Field of Classification Search ............ None
See application file for complete search history.

(56) References Cited

U.S. PATENT DOCUMENTS

| | | | |
|---|---|---|---|
| 707,533 A | 8/1902 | Albee | |
| 822,675 A | 6/1906 | Liliger | |
| 968,084 A * | 8/1910 | Schartow | 24/375 |
| 988,088 A | 3/1911 | Green | |
| 1,402,652 A | 1/1922 | Protis | |
| 1,466,615 A | 8/1923 | Falstrault | |
| 1,527,281 A | 2/1924 | Stapfer | |
| 1,839,838 A | 1/1932 | Fox | |
| RE28,709 E | 2/1976 | Crook, Jr. | |
| 3,940,173 A | 2/1976 | Ulbing | |
| 3,983,607 A | 10/1976 | Stevens, Jr. | |
| 4,017,111 A | 4/1977 | Sandnes | |
| 4,062,092 A | 12/1977 | Tamada et al. | |
| 4,073,042 A | 2/1978 | Miller | |
| 4,309,052 A | 1/1982 | Drayton | |
| 4,546,523 A | 10/1985 | Bailey, Jr. | |
| 4,621,851 A | 11/1986 | Bailey, Jr. | |
| 4,646,396 A | 3/1987 | Geese | |
| 5,271,128 A | 12/1993 | Storm | |
| 5,391,030 A | 2/1995 | Lee | |
| 5,577,787 A | 11/1996 | Klope | |
| 5,579,564 A | 12/1996 | Rullo et al. | |
| 5,638,584 A * | 6/1997 | De Anfrasio | 24/265 H |
| 5,832,572 A | 11/1998 | Norrby | |
| 5,913,479 A | 6/1999 | Westwood, III | |
| 6,000,108 A * | 12/1999 | Roan | 24/600.9 |
| 6,161,264 A | 12/2000 | Choate | |
| 6,283,524 B1 | 9/2001 | Simond | |
| 6,427,296 B1 | 8/2002 | Chang | |
| 6,561,724 B1 | 5/2003 | Carletti | |
| 6,772,488 B1 | 8/2004 | Jensen et al. | |

\* cited by examiner

*Primary Examiner* — Jack W. Lavinder
(74) *Attorney, Agent, or Firm* — Kenneth L. Green

(57) ABSTRACT

A safety hook includes a hook and a latch. The hook may be a twisted hook with a hooked portion twisted 90 degrees from a strap loop, or a flat "S" hook with the hooked portion and the strap loop in a single plane. The latch includes a full circle latch ring and a latch arm. The latch arm extends across a mouth opening of the hooked portion and is biased to prevent the hooked portion from disengaging from a wheel chair or other attachment point without forcing the latch arm away from the mouth. The latch ring resides against a loop portion of the hook and is held in place by grasps, fingers, lips, or the like which reach past center around a cross-section of the loop portion, or by molding-in-place over the loop portion, and by a strap attached around strap loop and the latch ring.

12 Claims, 23 Drawing Sheets

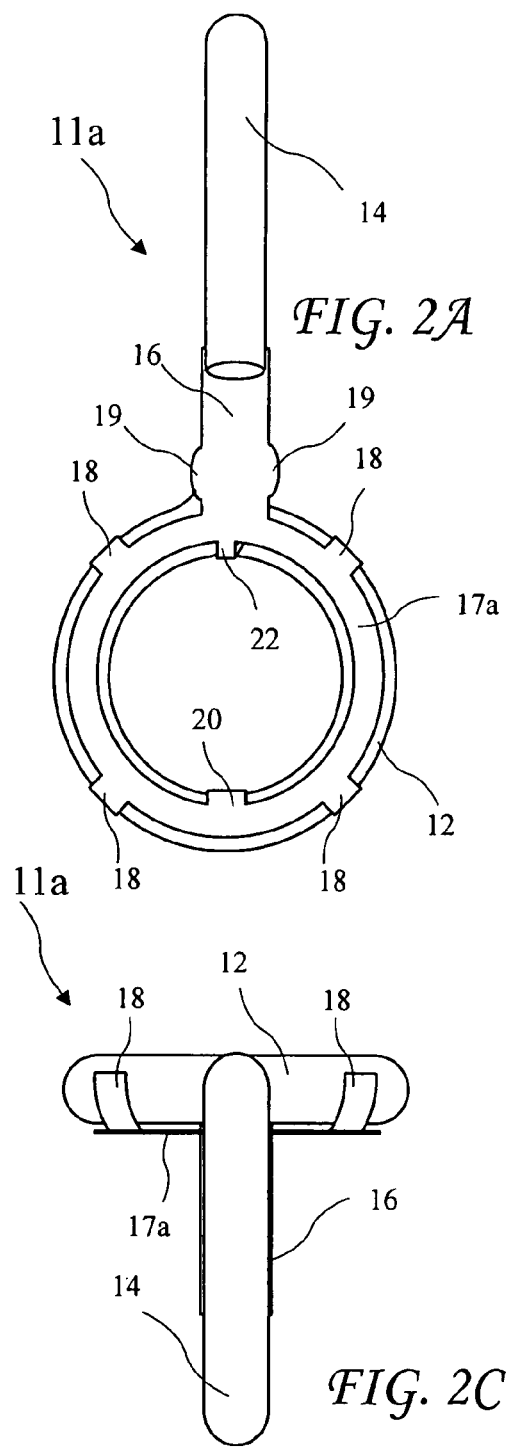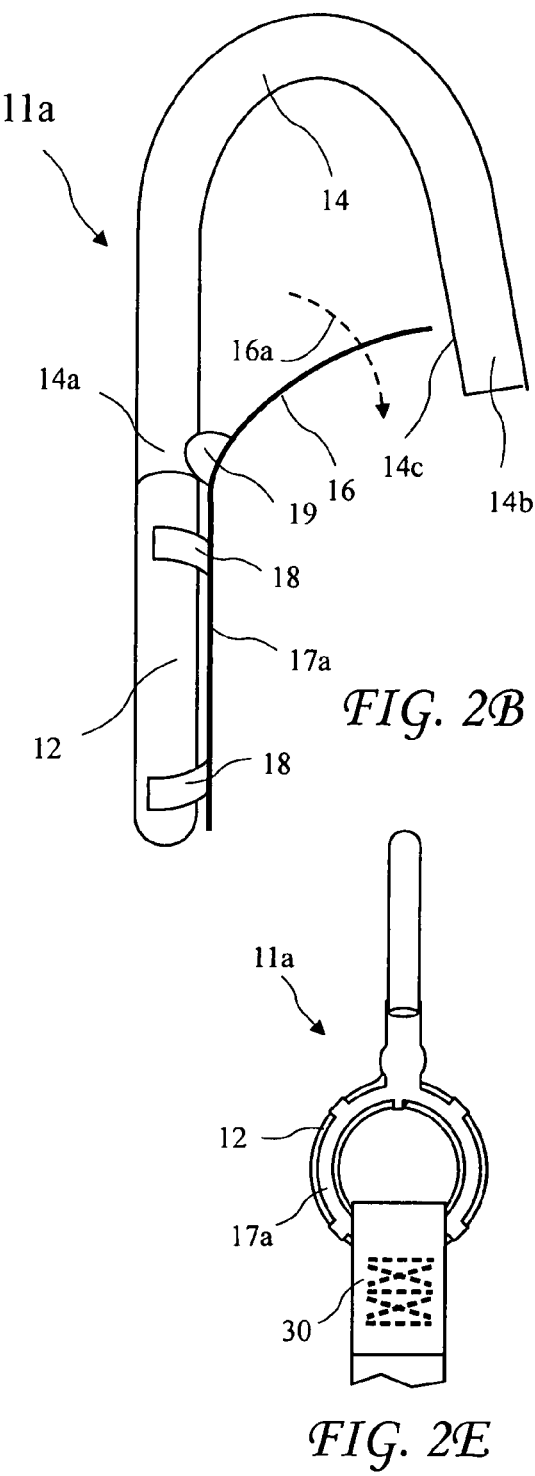

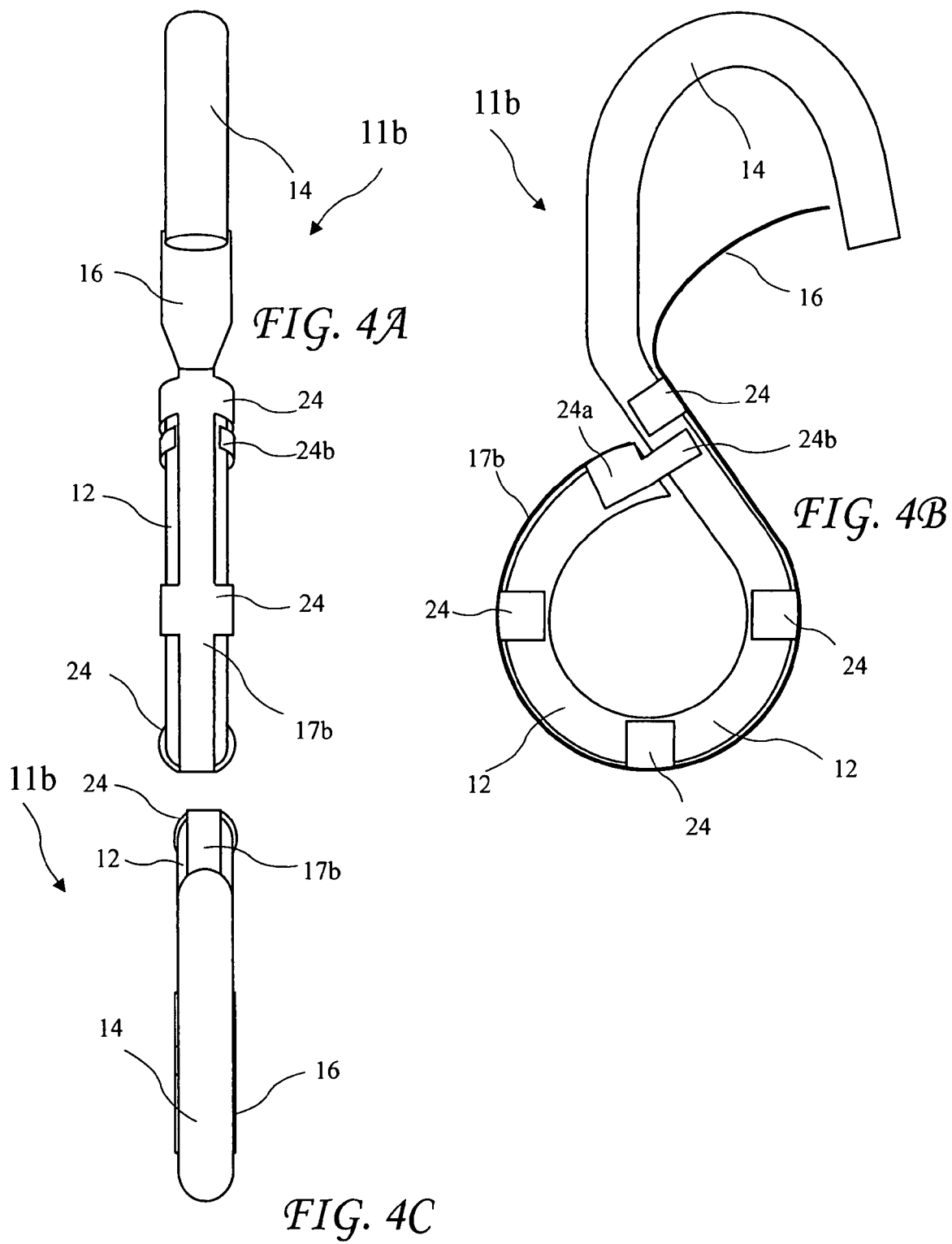

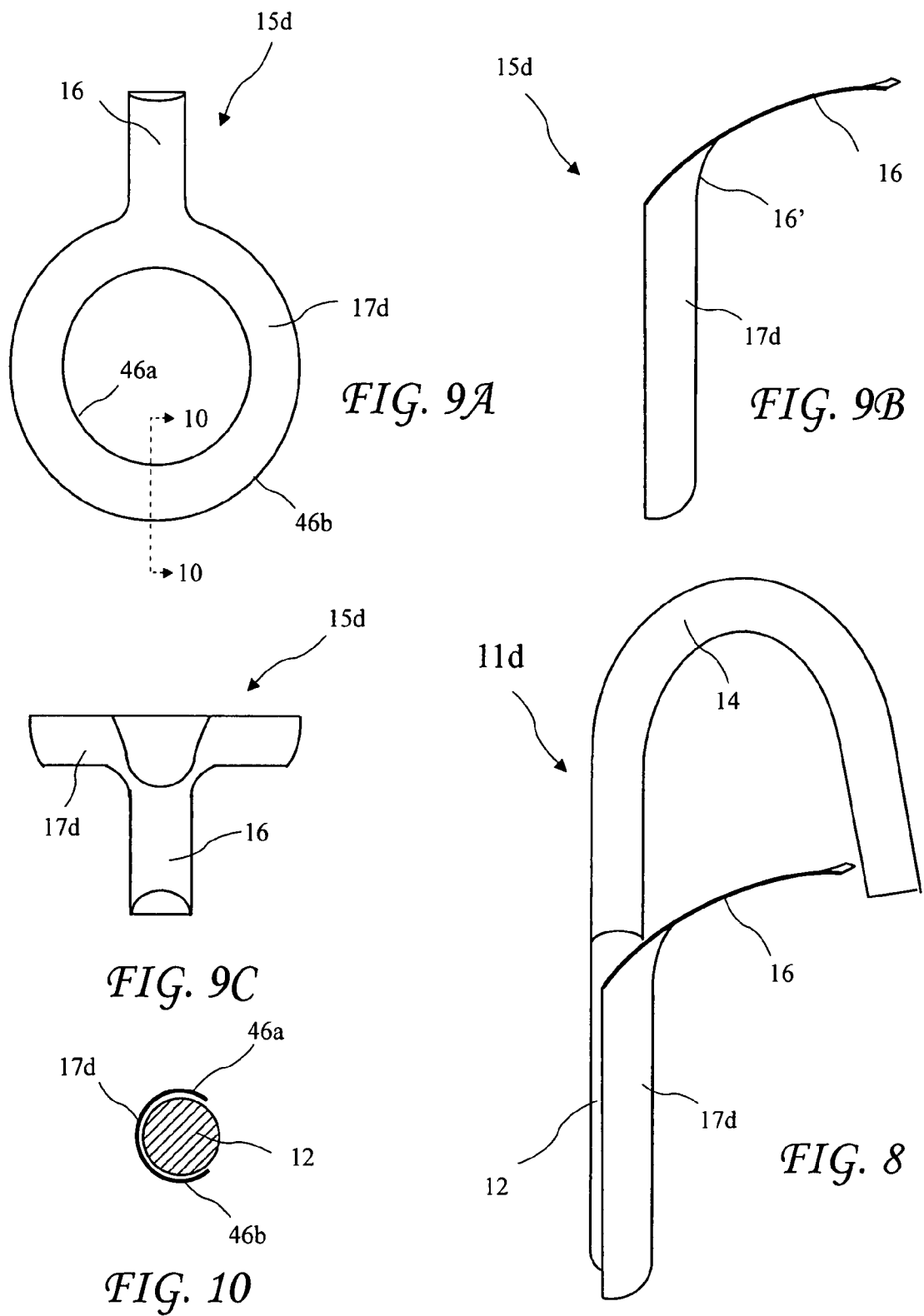

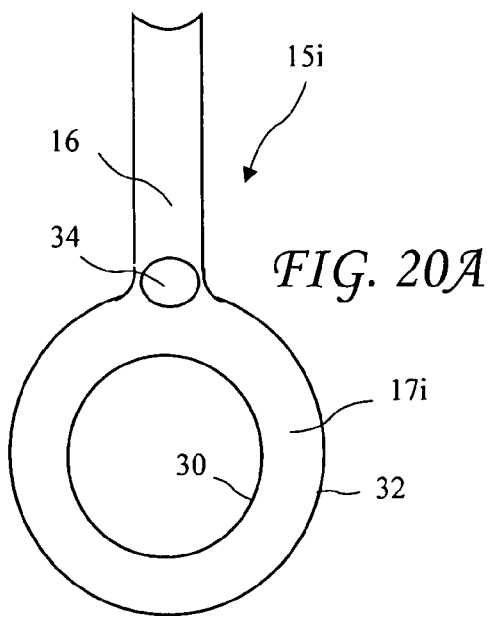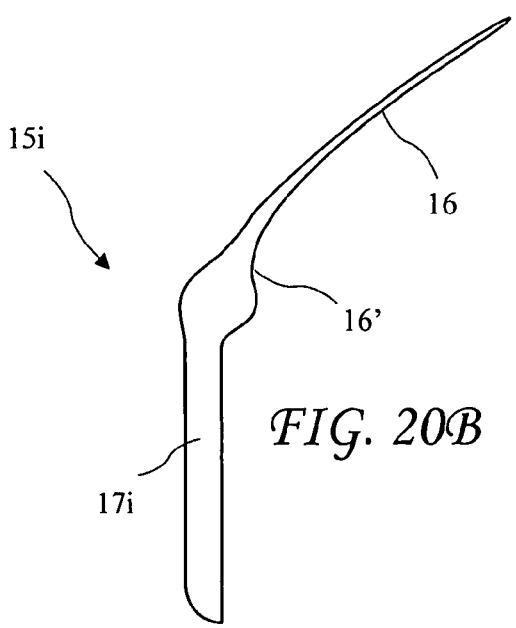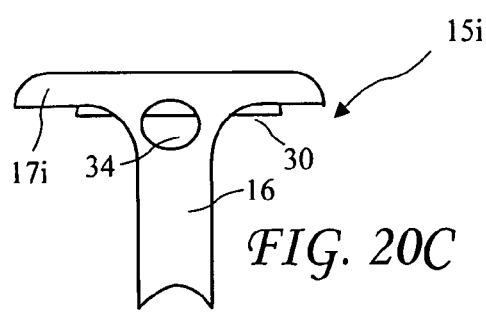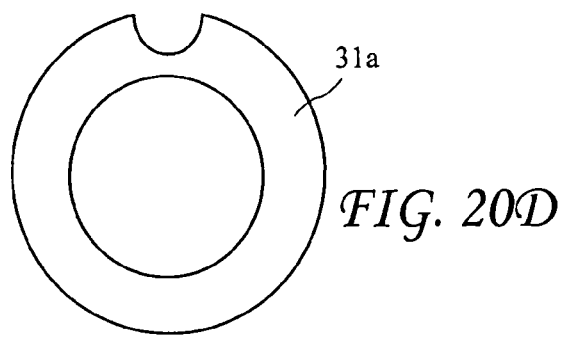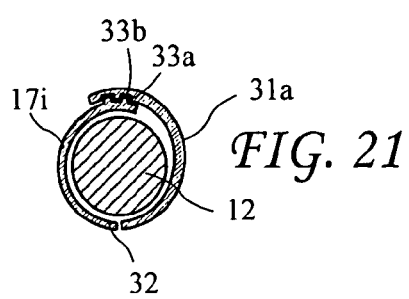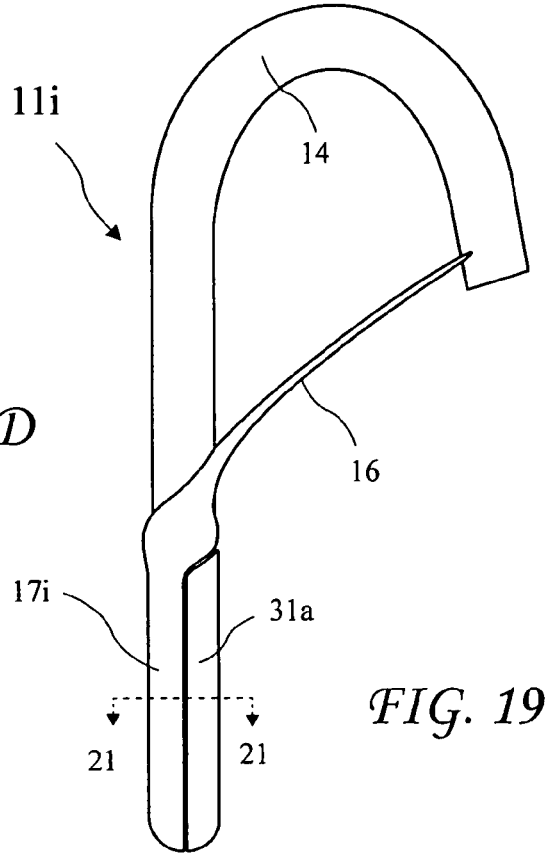

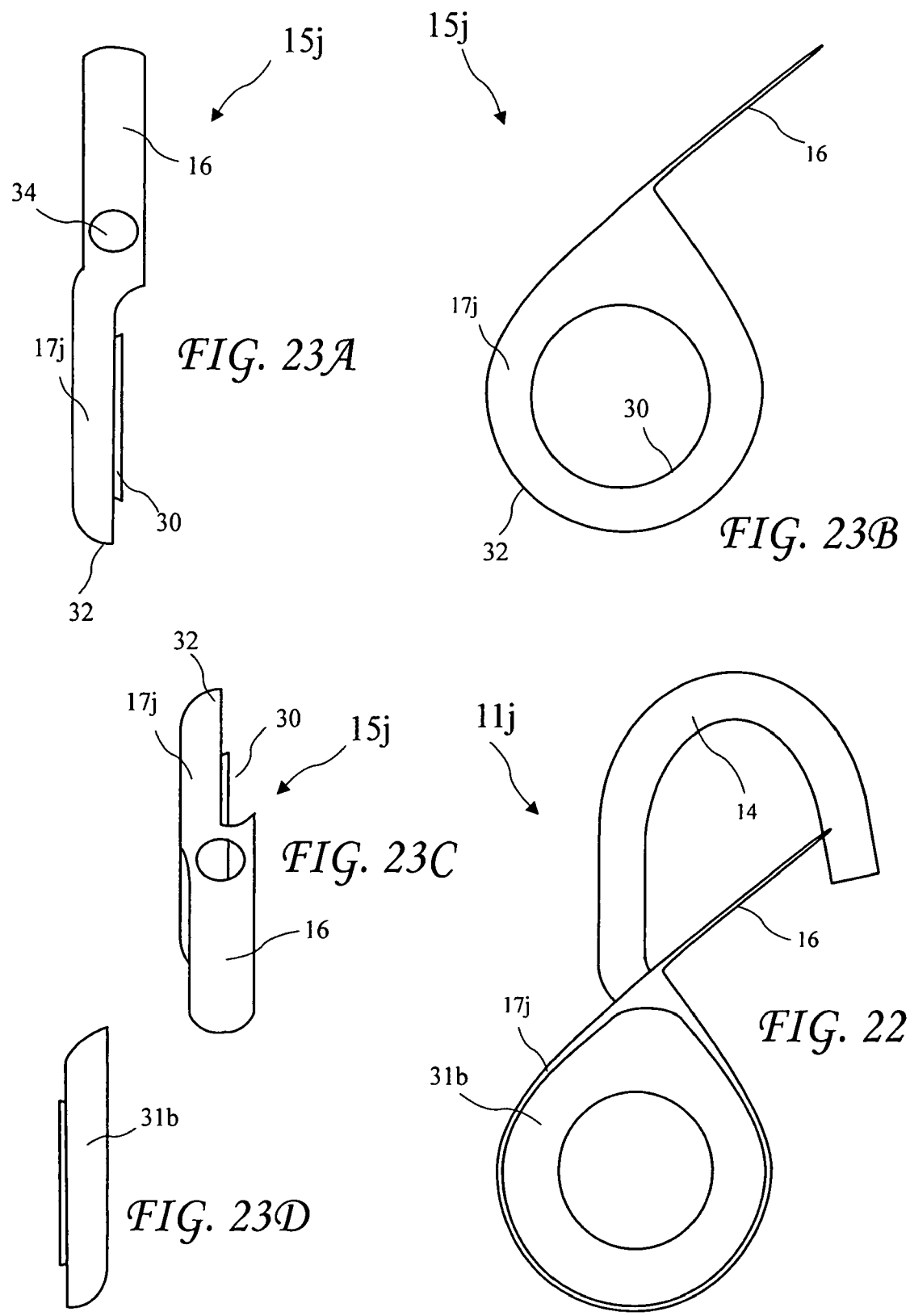

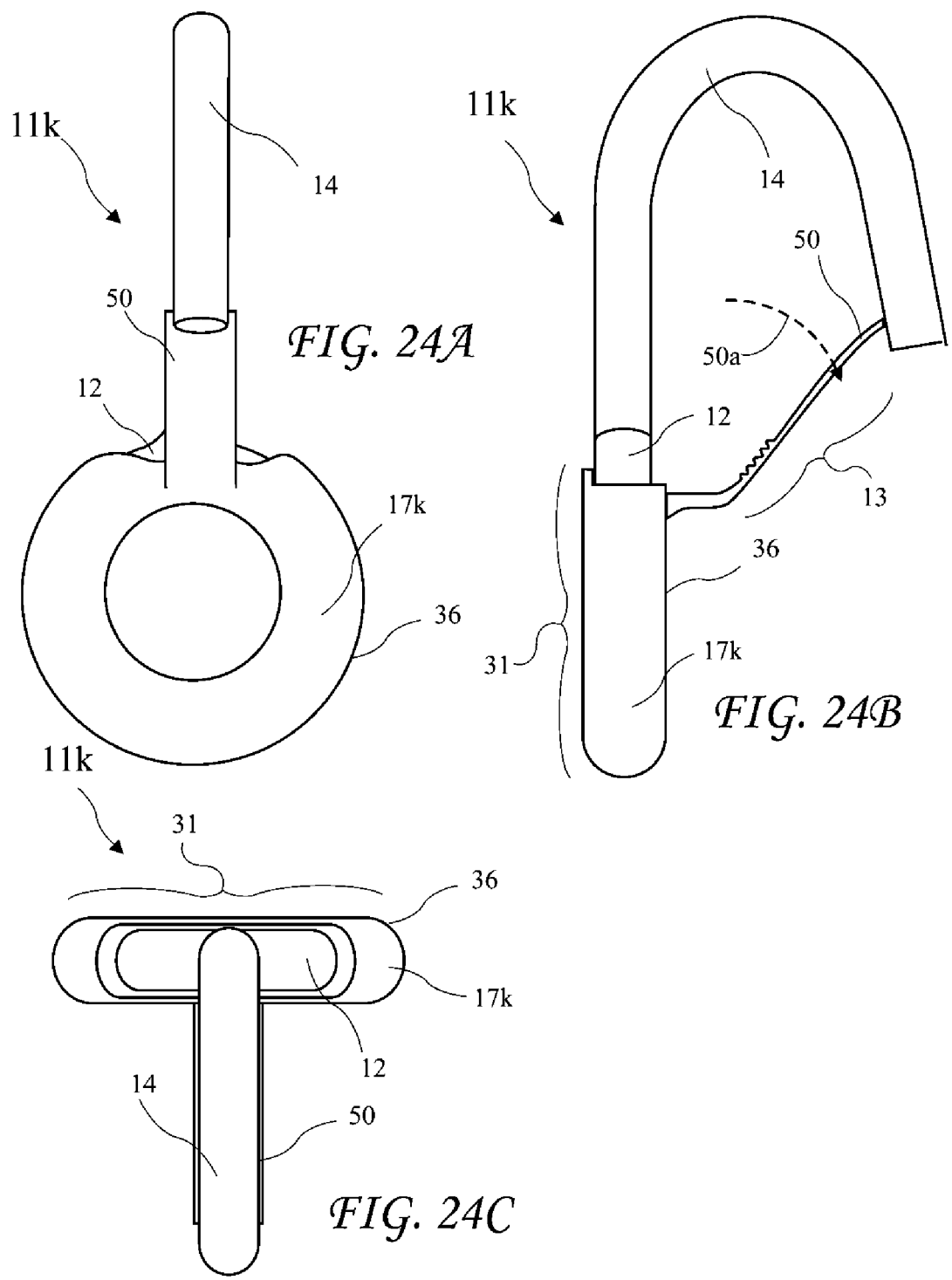

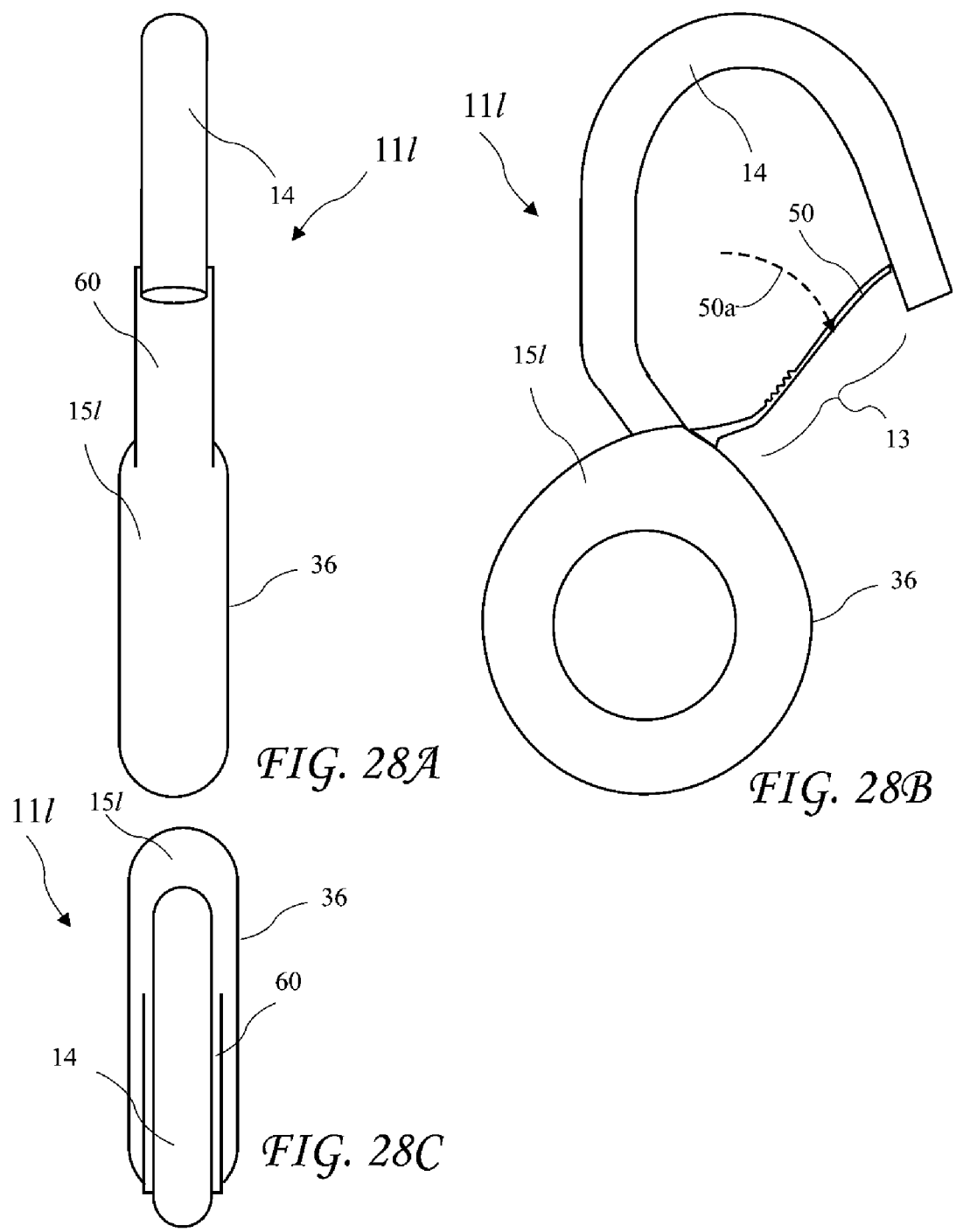

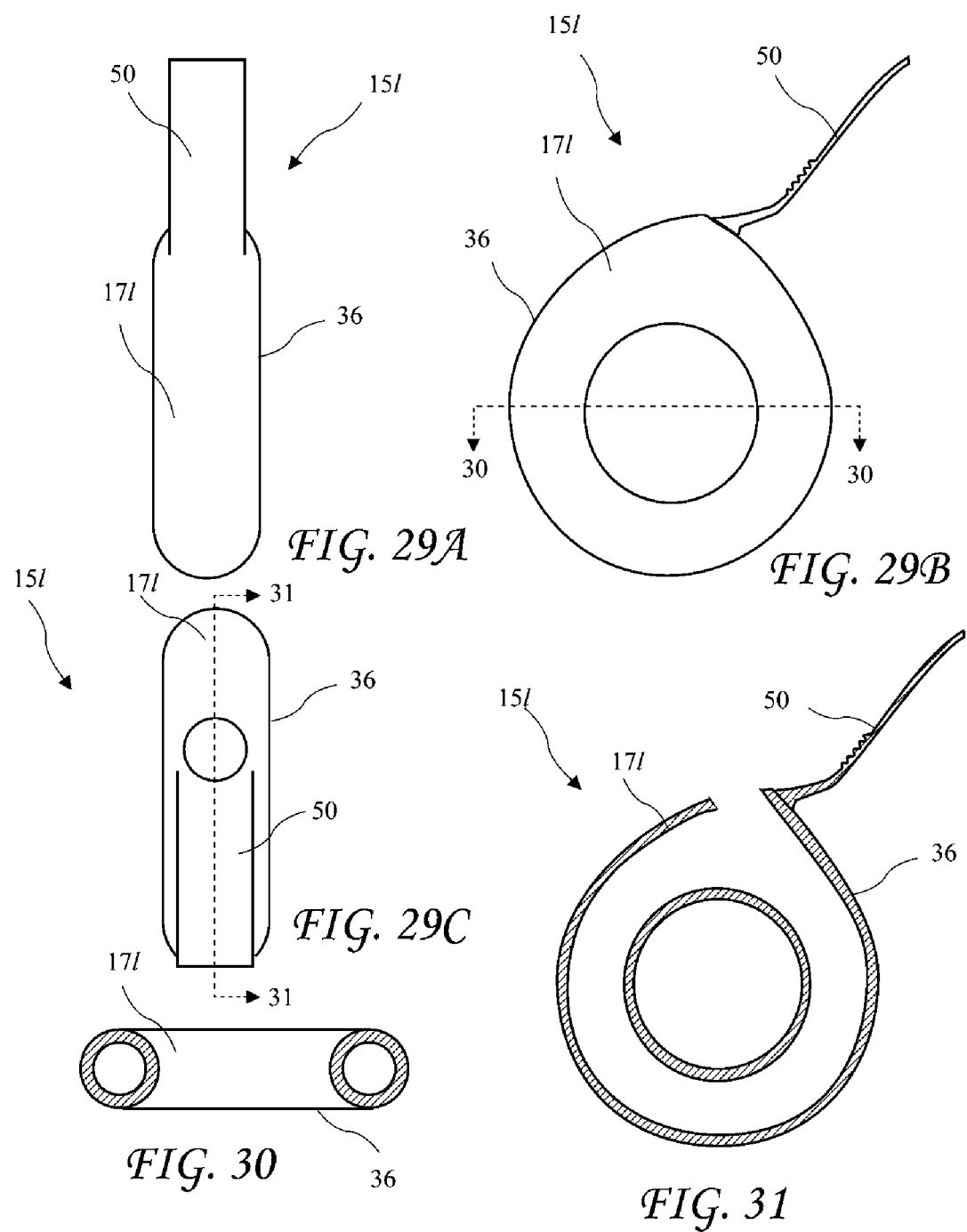

SAFETY HOOK

BACKGROUND OF THE INVENTION

The present invention relates to safety hooks and in particular to safety hooks attached to ends of belts or straps permanently attached to transport vehicles, wherein the safety hooks are used for securing occupied wheel chairs or unoccupied wheel chairs, motorcycles, and the like.

Society has exhibited a great willingness to assist handicapped individuals in attaining an independent life style. Because the handicapped often are unable to operate a motor vehicle, an important element to attaining an independent life style is access to public transportation such as busses and the like. A handicapped person often must use a wheel chair, and use of public transportation requires that the wheel chair be safely anchored within the bus.

The Federal Government has established standards for anchoring wheel chairs and the occupants of wheel chairs. These standards include a requirement that the occupant anchoring hardware shall be designed to prevent the anchoring hardware and related parts from becoming disengaged from the vehicle while in service. Straps are generally used to anchor the wheel chairs in the vehicles and lap and shoulder belts are generally used to anchor the occupant of the wheelchair. One end of each strap is generally attached to a specially designed quick release device or hold down on the vehicle floor and an opposite end of each strap includes a hook for engaging the wheel chair. The straps are tensioned to hold the wheel chairs in place and to hold the hooks in engagement with the wheel chair. Unfortunately human error, or during acceleration, braking, or turning, sufficient force may result to cause some of the straps to become loose, and the hooks may disengage from the wheel chair structure.

BRIEF SUMMARY OF THE INVENTION

The present invention addresses the above and other needs by providing a safety hook which includes a hook and a latch. The hook may be a twisted hook with a hooked portion twisted 90 degrees from a loop portion, or a flat "S" hook with the hooked portion and the loop portion in a single plane. The latch includes a full circle latch ring and a latch arm. The latch arm extends across a mouth opening of the hooked portion and is biased to prevent the hooked portion from disengaging from a wheel chair or other attachment point without forcing the latch arm away from the mouth. The latch ring resides against the loop portion and is held in place by grasps, fingers, lips, or the like which reach past center around a cross-section of the loop portion, or by molding-in-place over the loop portion, and by a strap attached around the loop portion and the latch ring.

In accordance with one aspect of the invention, there is provided a safety hook comprising a hook, a latch, and a strap. The hook comprises a hooked portion and a strap loop. The hooked portion defines a hook mouth, and the strap loop comprises a substantially full circle and is attached to the hooked portion. The latch comprises a latch ring and a latch arm. The latch ring comprises a flat full circular ring and resides against the strap loop and the latch arm is attached to the latch ring and normally resides across the hook mouth. The strap is attached around the strap loop and the latch ring, and holds the latch ring against the strap loop.

In accordance with one aspect of the invention, there is provided a safety hook comprising a hook, a latch, and a strap. The hook comprises a hooked portion and a loop portion. The hooked portion defines a hook mouth, and the loop portion comprises a substantially full circle and is attached to the hooked portion. The latch comprises a latch ring and a latch arm. The latch ring comprises a flat full circular ring and resides against the loop portion and the latch arm is attached to the latch ring and normally resides across the hook mouth. The strap is attached around the loop portion and the latch ring, and holds the latch ring against the loop portion.

In accordance with another aspect of the invention, there is provided a safety hook comprising a hook, a latch, and a strap. The hook comprises a hooked portion and a loop portion, the hooked portion forming a mouth. The latch comprises a latch ring and a latch arm. The latch arm is attached to the latch ring, extends across the hook mouth, and is biased to close against an opposite side of the mouth. The latch ring comprises a full circular ring and resides against the loop portion, and is held against the loop portion by a portion of the latch ring which reaches around the outside of the loop portion and past center to grasp the loop portion.

In accordance with another aspect of the invention, there is provided a safety hook including a hook, a latch, a locking ring, and a strap. The hook includes a loop portion and a hooked portion. The hooked portion has a loop end extending from the loop portion, a mouth end opposite the loop end and having an inner face facing the loop end, and a hook mouth between the loop end and the mouth end for attaching the hook to an object. The latch includes a latch ring residing against the loop portion and a latch arm extending from the latch ring towards the mouth end of the hooked portion and biased towards the inner face of the mouth end for retaining the hook on the object. The locking ring resides on a side of the loop portion opposite the latch ring and engages the latch to hold the latch on the loop portion. The strap attaches around the loop portion and the latch ring and the locking ring, and further retains the latch ring against the loop portion.

In accordance with another aspect of the invention, there is provided a safety hook including a hook, a plastic molded-in-place latch, and a strap. The hook includes a loop portion and a hooked portion having a loop end extending from the loop portion, a mouth end opposite the loop end and having an inner face facing the loop end, and a hook mouth between the loop end and the mouth end for attaching the hook to an object. The molded-in-place latch includes a molded-in-place latch ring molded around the loop portion enclosing and covering at least approximately 75% of the loop portion, a molded-in-place latch arm extending from the molded-in-place latch ring towards the mouth end of the hooked portion and biased towards the inner face of the mouth end. The strap is attached around the loop portion and the latch ring and further holds the latch ring against the loop portion.

In accordance with yet another aspect of the invention, there is provided a safety hook having a strap or belt sewn around an eye of the hook, thereby permanently entrapping the latch ring of the latch against the eye of the hook.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2A is a front view of a first safety hook comprising the twisted hook and a first latch according to the present invention.

FIG. 2B is a side view of the first safety hook.

FIG. 2C is a top view of the first safety hook.

FIG. 2E shows the first safety hook with a strap attached to hold the first latch against a strap loop of the safety hook.

FIG. 4A is a front view of a second safety hook with a second latch according to the present invention.

FIG. 4B is a side view of the second safety hook.

FIG. 4C is a top view of the second safety hook.

FIG. 8 shows a fourth safety hook and a fourth latch according to the present invention.

FIG. 9A is a front view of the fourth latch according to the present invention.

FIG. 9B is a side view of the fourth latch.

FIG. 9C is a top view of the fourth latch.

FIG. 10 is a cross-sectional view of a latch ring of the fourth safety hook according to the present invention taken along line 10-10 of FIG. 9A.

FIG. 19 shows a ninth safety hook with a first plastic latch according to the present invention.

FIG. 20A is a front view of the first plastic latch according to the present invention.

FIG. 20B is a side view of the first plastic latch.

FIG. 20C is a top view of the first plastic latch.

FIG. 20D is a first locking ring according to the present invention for cooperation with the first plastic latch.

FIG. 21 is a cross-sectional view of a latch ring of the first plastic latch grasping the strap portion of the hook.

FIG. 22 shows a tenth safety hook with a second plastic latch according to the present invention.

FIG. 23A is a front view of the second plastic latch according to the present invention.

FIG. 23B is a side view of the second plastic latch.

FIG. 23C is a top view of the second plastic latch.

FIG. 23D is a second locking ring according to the present invention for cooperation with the second plastic latch.

FIG. 24A is a front view of an eleventh safety hook with a first molded-in-place latch according to the present invention.

FIG. 24B is a side view of the eleventh safety hook.

FIG. 24C is a top view of the eleventh safety hook.

FIG. 28A is a front view of a twelfth safety hook with a second molded-in-place latch according to the present invention.

FIG. 28B is a side view of the twelfth safety hook.

FIG. 28C is a top view of the twelfth safety hook.

FIG. 29A is a front view of the second molded-in-place latch according to the present invention.

FIG. 29B is a side view of the second molded-in-place latch.

FIG. 29C is a top view of the second molded-in-place latch.

FIG. 30 is a cross-sectional view of the second molded-in-place latch taken along line 30-30 of FIG. 29B.

FIG. 31 is a cross-sectional view of the second molded-in-place latch taken along line 31-31 of FIG. 29C.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
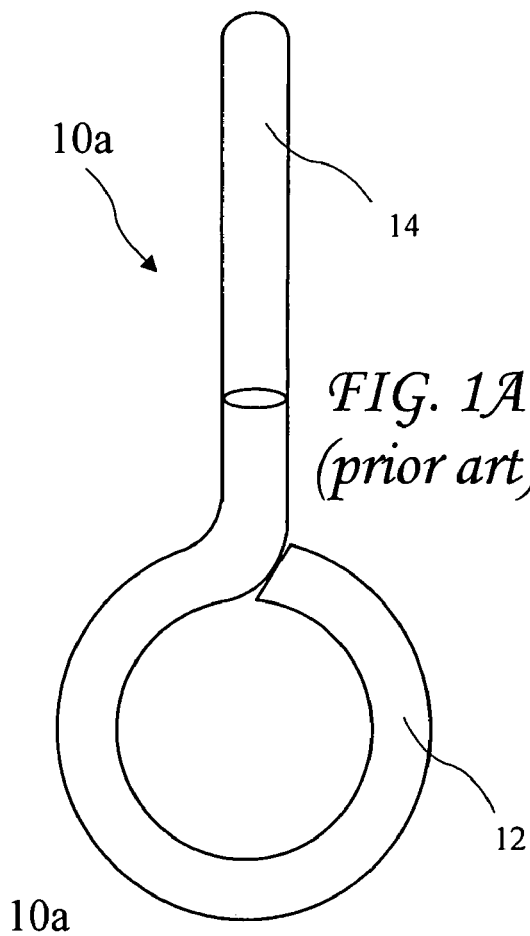
FIG. 1A is a front view of a prior art twisted hook.
Figure 1B:
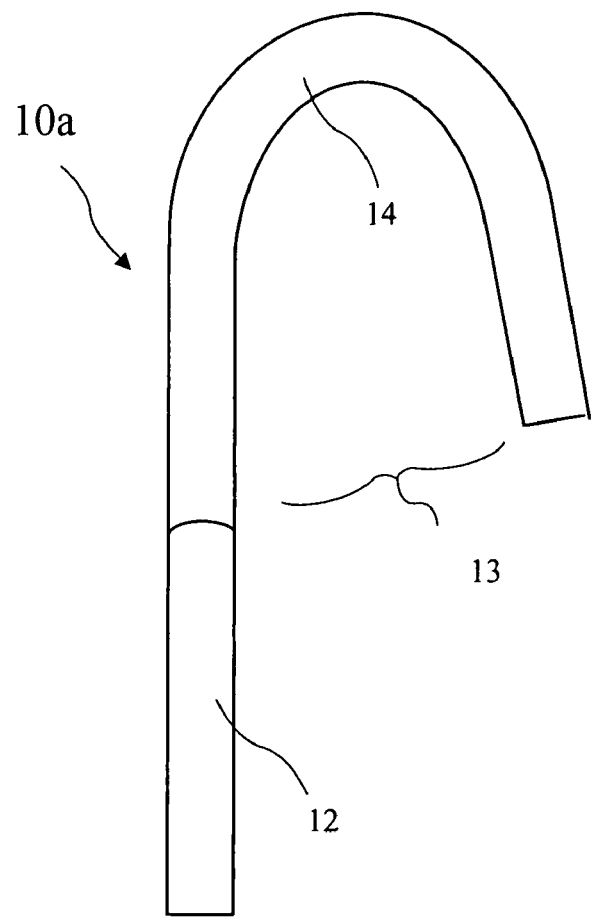
FIG. 1B is a side view of the prior art twisted hook.
Figure 1C:
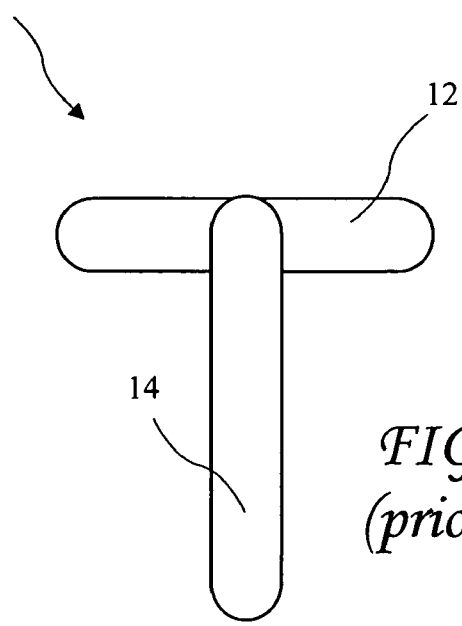
FIG. 1C is a top view of the prior art twisted hook.

A front view of a prior art twisted hook 10a is shown in FIG. 1A, a side view of the twisted hook 10a is shown in FIG. 1B, and a top view of the twisted hook 10a is shown in FIG. 1C. The hook 10a includes a loop portion 12 and a hooked portion 14 and is generally formed from a single piece of material. A strap 30 (see FIGS. 8A and 8B) is generally attached to the loop portion 12 and the hooked portion is hooked around a hold down 42 (see FIG. 9) to restrain, for example, a wheel chair 40 (see FIG. 9).

Figures 1D, 1E, 1F:
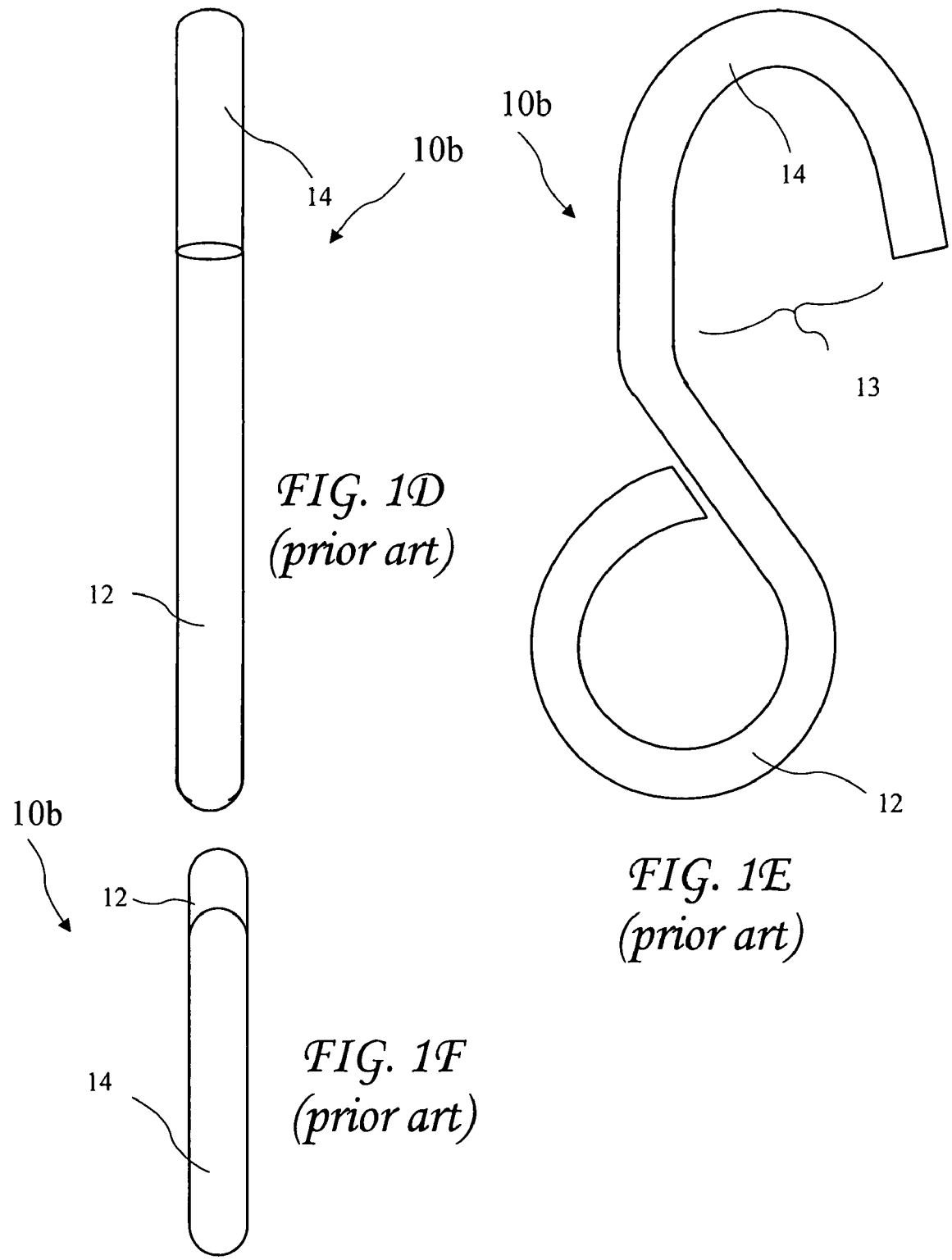
FIG. 1D is a front view of a prior art flat hook.
FIG. 1E is a side view of the prior art flat hook.
FIG. 1F is a top view of the prior art flat hook.

A front view of a prior art flat hook 10b is shown in FIG. 1D, a side view of the flat hook 10b is shown in FIG. 1E, and a top view of the flat hook 10b is shown in FIG. 1F. The flat hook 10b includes the loop portion 12 and the hooked portion 14 and like the twisted hook 10b is generally formed from a single piece of material. Unfortunately, when a wheel chair is restrained in a moving vehicle such as a bus, motion of the bus may result in the hook being released from the hold down, and injury to the wheel chair occupant may result.

A front view of a first safety hook 11a comprising the twisted hook 10a and a first latch 15a (see FIGS. 3A-3C) according to the present invention is shown in FIG. 2A, a side view of the first safety hook 11a is shown in FIG. 2B, and a top view of the first safety hook 11a is shown in FIG. 2C. The first safety hook 11a includes a first latch 15a (see FIGS. 3A, 3B, and 3C) for preventing the hooked portion 14 from slipping out of a hold down. The latch 15a includes a latch arm 16 and a latch ring (or latch ring portion) 17a. The latch arm 16 preferably defines a continuous curved member extending from the latch ring 17a. Guides (or wings) 19 may be provided to align the latch arm 16 with the hooked portion 14. The hooked portion 14 includes a loop end 14a, a mouth end 14b, and an inner face 14c. The loop end 14a is proximal to the transition from the hooked portion 14 to a loop portion 12 of the hook, and the mouth end 14b is opposite the loop end 14a. The inner face 14c is a portion of the surface of the mouth end 14b which faces the loop end 14a. The gap between the loop end 14a and the mouth end 14b forms a mouth 13 (see FIG. 1B) for hooking the hooked end 14 over, for example, the hold down 42 (see FIG. 33). The latch ring 17a comprises a flat circular band which preferably forms a complete circle and resides against one side of the loop portion 12.

Figure 33:
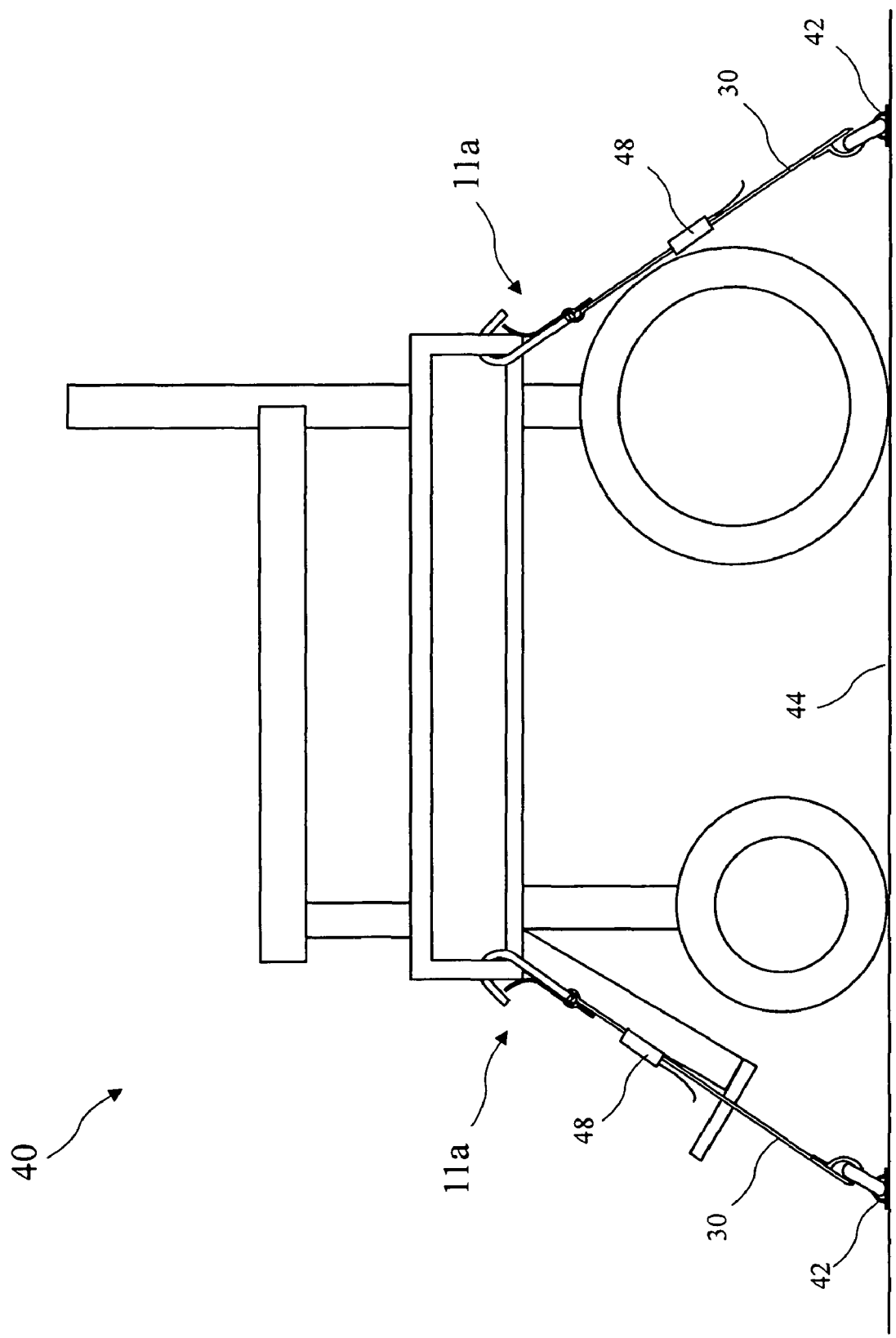
FIG. 33 is a side view of a wheel chair connected to a vehicle floor using the safety hooks according to the present invention.

The latch arm 16 normally extends across the mouth 13 (see FIG. 1B) to prevent or restrict the accidental release of the safety hook 11a from the hold down 42 (see FIG. 33). The latch arm 16 is springedly biased to a latched position as shown by arc 16a. The latch ring 17a includes four spaced apart outside grasps 18 reaching around the outside of the loop portion 12 and past center for retaining the latch 15a on the strap loop 12. The latch ring 17a further includes a bottom inside grasp 20 and a top inside grasp 22 for further retaining the latch 15a on the loop portion 12. The latch ring 17a may have more or less grasps than shown, and may be held against the strap loop 12 by various means and is further held against the loop portion 12 by the strap 30 (see FIGS. 24A and 24B).

Figure 2D:
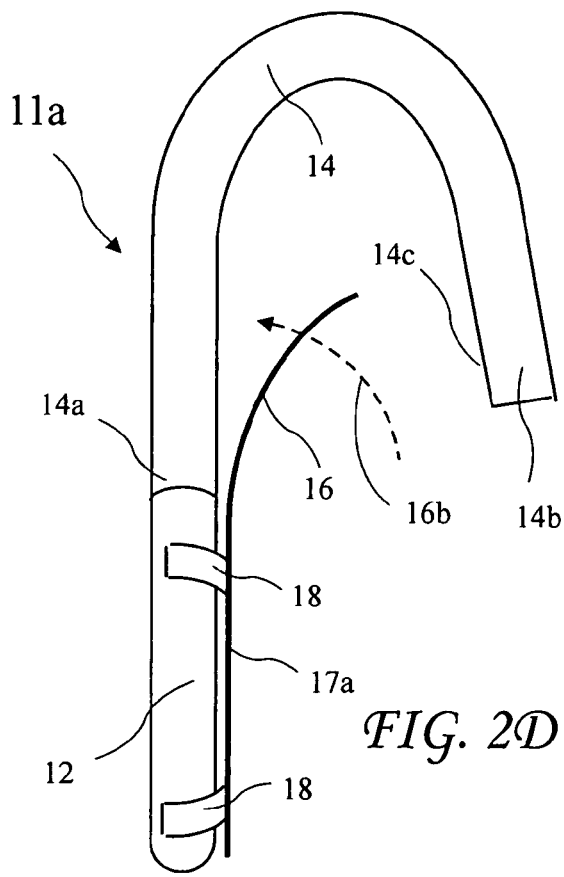
FIG. 2D is a side view of the first safety hook with a latch arm pushed away from a mouth end of a hook portion of the hook.

A side view of the safety hook 11a with a latch arm 16 pushed away from the mouth end 14a of the hooked portion 14 is shown in FIG. 2D. The latch arm 16 may be thus pushed along arc 16b to attach the safety hook and latch 11a to the wheel chair 40, or to release the safety hook and latch 11a from the wheel chair 40. The latch arm 16 is preferably made from a springy material and returns to the latched position shown in FIG. 2B when released. The latch arm 16 may alternatively include a separate spring or the like to bias the latch arm 16 to the latched position.

The first safety hook 11a with a strap 30 attached around the latch ring 17a and loop portion 12 to hold the latch ring 17a against the loop portion 12 of the safety hook is shown in FIG. 2E. The strap 30 thus secures the latch 15a to the hook 10 (see FIGS. 1A-1C). The strap 30 is described in more detail in FIGS. 32A and 32B.

Figure 3A:
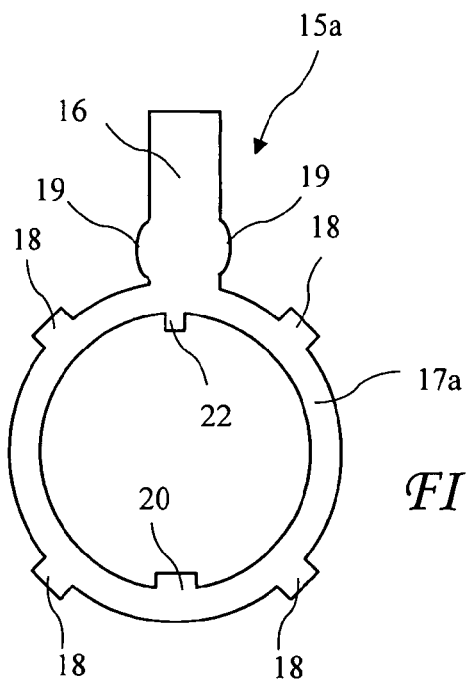
FIG. 3A is a front view of the first latch according to the present invention.
Figure 3B:
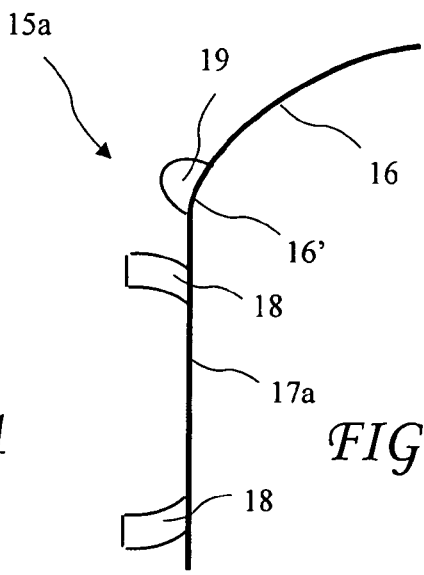
FIG. 3B is a side view of the first latch.
Figure 3C:
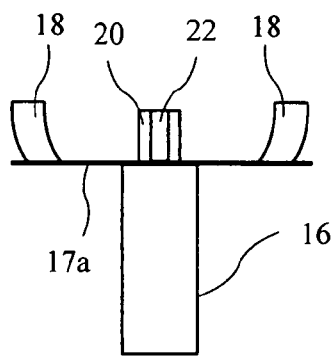
FIG. 3C is a top view of the first latch.

A front view of the first latch 15a according to the present invention is shown in FIG. 3A, a side view of the latch 15a is shown in FIG. 3B, and a top view of the latch 15a is shown in FIG. 3C. The latch 15a is seen to comprise the latch arm 16, the latch ring 17a, spaced apart outside grasps 18, and inside grasps 20 and 22. Preferably, a continuously curved transition portion 16' resides between the latch ring 17 and the latch arm 16. Such continuous curve allows many operations of the latch without cracking or other failure. The guides 19 reside proximal to the transition portion 16'. The latch 15a is preferably made from ½ hard stainless steel AMS-5518 hard ASTM-A-666-96B with ultimate tensile strength of 159,000/164,000, yield strength at 0.2 percent offset of 127,000/130,000, and percentage elongated in two inches of 31/32 percent, or a material with similar physical qualities.

A front view of a second safety hook 11b comprising the flat hook 10b and a second latch 15b (see FIGS. 5A-5C) according to the present invention is shown in FIG. 4A, a side view of the second safety hook 11b is shown in FIG. 4B, and a top view of the second safety hook 11b is shown in FIG. 4C. The safety hook 11b comprises the flat hook 10b (see FIGS. 1D-1F) and a second latch 15b. The second latch 15b is held against the outside diameter of the loop portion 12 by four pairs of spaced apart opposing grasps 24, and a second outside grasp 24a which includes lateral grasps 24b which engage an adjacent portion of the loop portion 12. The safety hook 11b is otherwise similar to the first safety hook 11a.

Figure 5A:
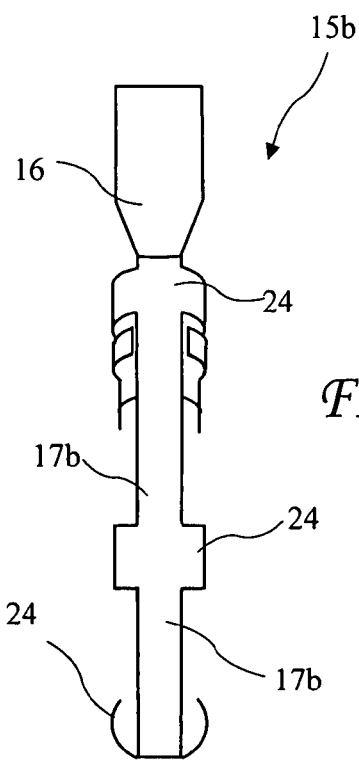
FIG. 5A is a front view of the second latch according to the present invention.
Figure 5B:
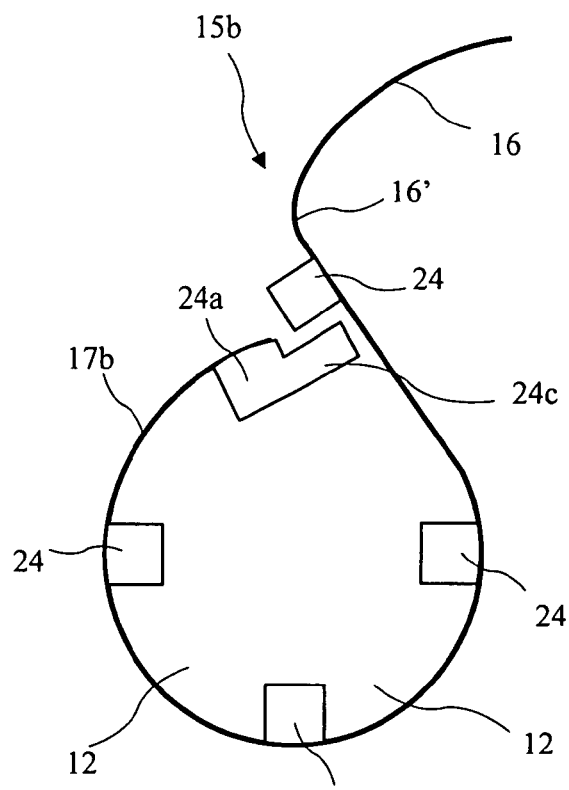
FIG. 5B is a side view of the second latch.
Figure 5C:
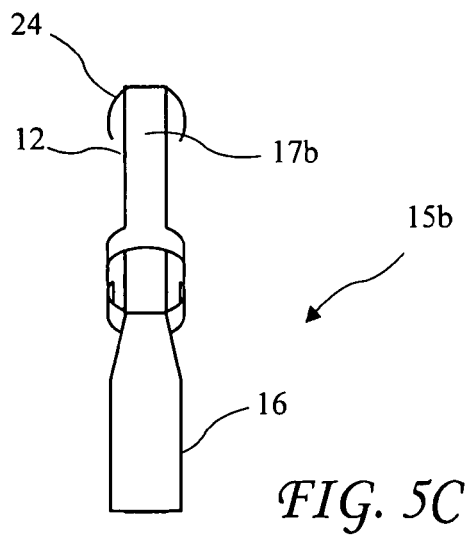
FIG. 5C is a top view of the second latch.

A front view of the second latch 15b according to the present invention is shown in FIG. 5A, a side view of the latch 15b is shown in FIG. 5B, and a top view of the latch 15b is shown in FIG. 5C. The latch 15b is seen to comprise the latch arm 16, the latch ring 17b, spaced apart opposing grasps 24, and the second outside grasp 24a which includes lateral grasps 24b.

Figure 6A:
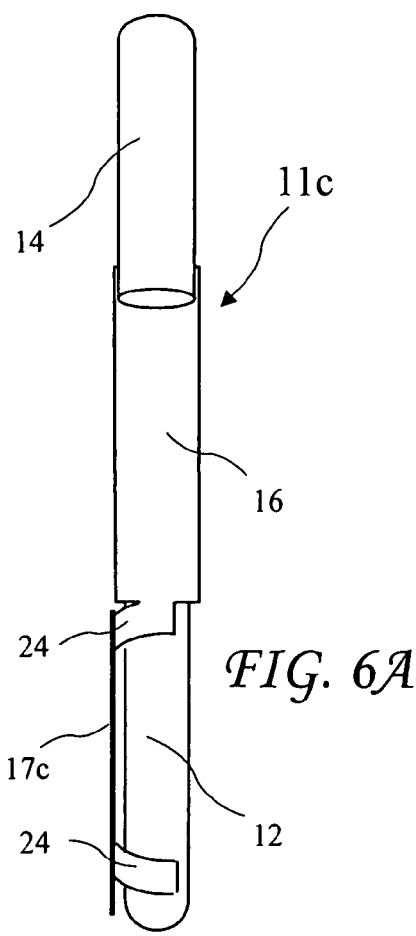
FIG. 6A is a front view of a third safety hook with a third latch according to the present invention.
Figure 6B:
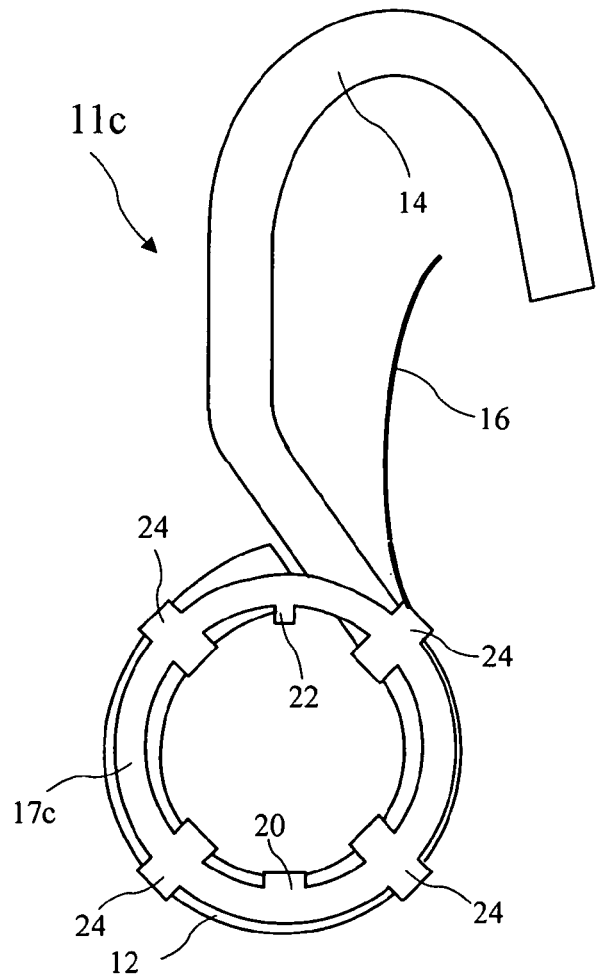
FIG. 6B is a side view of the third safety hook.
Figure 6C:
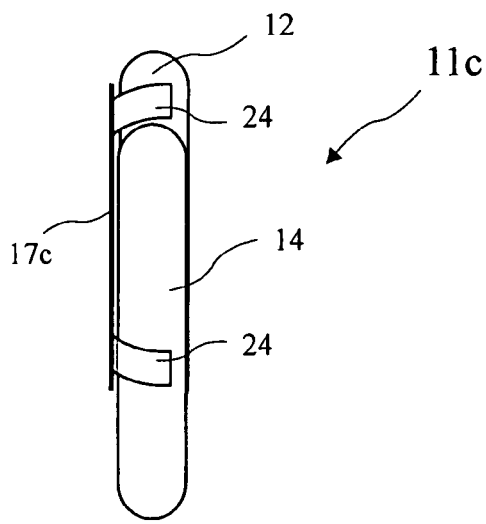
FIG. 6C is a top view of the third safety hook.

A front view of a third safety hook 11c comprising the flat hook 10b and a third latch 15c (see FIGS. 7A-7C) according to the present invention is shown in FIG. 6A, a side view of the third safety hook 11c is shown in FIG. 6B, and a top view of the third safety hook 11c is shown in FIG. 6C. The third safety hook 11c comprises the flat hook 10b and a third latch 15c (see FIGS. 7A-7C). A third latch ring 17c is held against the side of the loop portion 12 by four pairs of spaced apart opposing grasps 24, and two opposing inside grasps 20 and 22. The third safety hook 11c is otherwise similar to the first safety hook 11a.

Figure 7A:
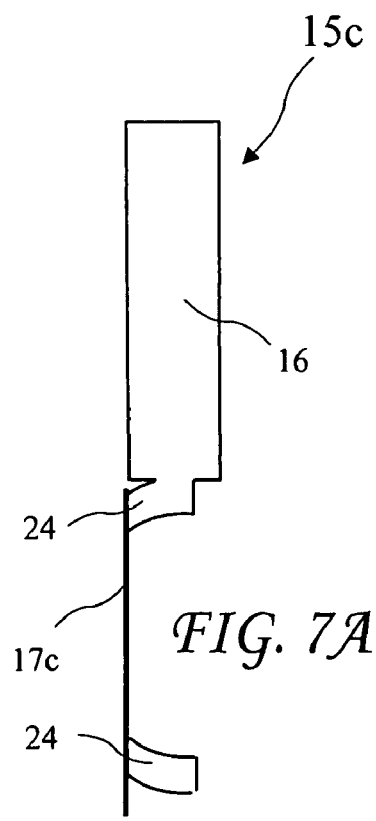
FIG. 7A is a front view of the third latch according to the present invention.
Figure 7B:
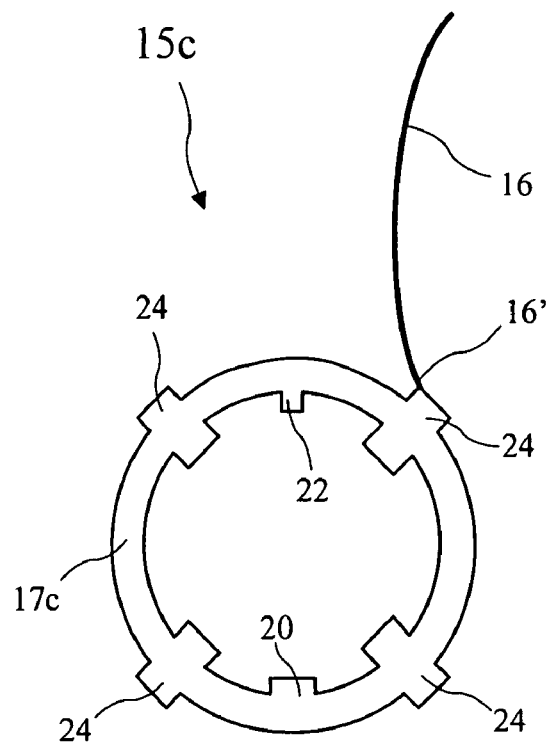
FIG. 7B is a side view of the third latch.
Figure 7C:
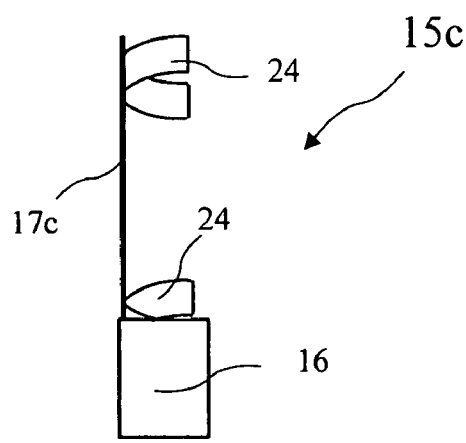
FIG. 7C is a top view of the third latch.

A front view of the latch 15c according to the present invention is shown in FIG. 7A, a side view of the latch 15c is shown in FIG. 7B, and a top view of the latch 15c is shown in FIG. 7C. The latch 15b is seen to comprise the latch arm 16, the latch ring 17c, spaced apart opposing grasps 24, and the two opposing inside grasps 20 and 22.

A side view of a fourth safety hook 11d comprising the twisted hook 10a and a fourth latch 15d (see FIGS. 9A-9C) according to the present invention is shown in FIG. 8. The latch 15d includes a fourth latch ring 17d residing on a front surface of the loop portion 12 and having continuous lips which reach around the outside past center of the loop portion 12 to retain the latch 15d on the loop portion 12. The latch 15d is preferably formed by draw forming.

A front view of the latch 15d is shown in FIG. 9A, a side view of the latch 15d is shown in FIG. 9B, and a top view of the latch 15d is shown in FIG. 9C. The latch 15d preferably includes a latch ring 17d with an inner lip 46a and an outer lip 46b which one or both reach past center to grasp the loop portion 12. The latch 15d is otherwise similar to the latch 15a (see FIGS. 2A-2D, and 3A-3C).

A cross-sectional view of the latch ring 17d taken along line 10-10 of FIG. 9A is shown in FIG. 10. The latch ring is seen to include the lips 46a and 48b configured to grasp the loop portion 12.

Figure 11:
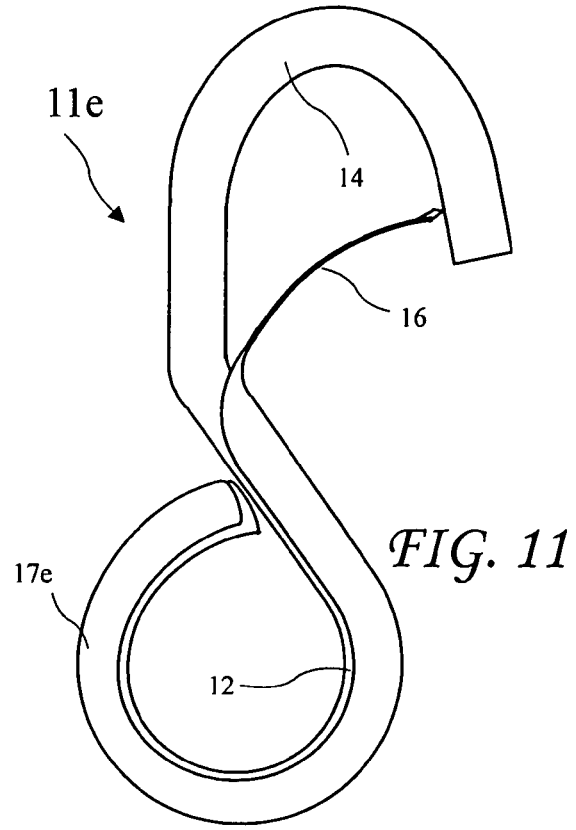
FIG. 11 shows a fifth safety hook and fifth latch according to the present invention.

A side view of a fifth safety hook 11e comprising the flat hook 10b and a fifth latch 15e (see FIGS. 12A-12C) according to the present invention is shown in FIG. 11. The latch 15e includes a fifth latch ring 17e residing about an outer diameter of the loop portion 12 with lips which cup the loop portion 12. The latch 15e is preferably formed by draw forming.

Figure 12A:
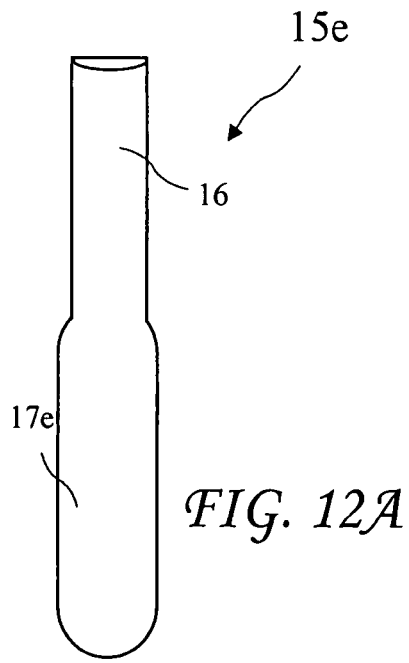
FIG. 12A is a front view of the fifth latch according to the present invention.
Figure 12B:
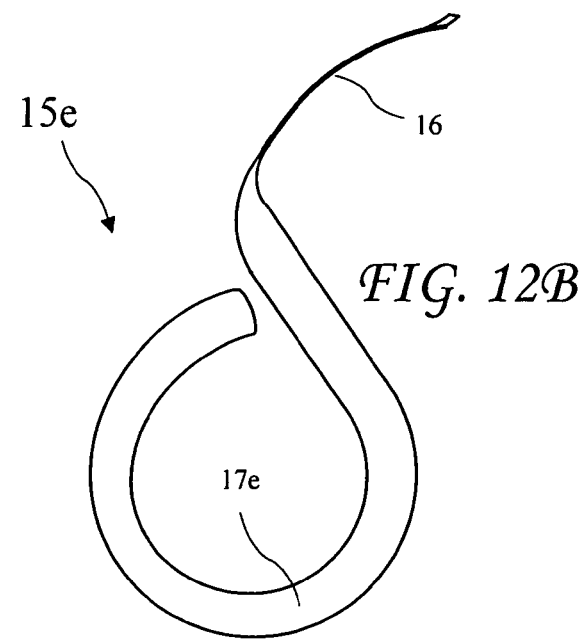
FIG. 12B is a side view of the fifth latch.
Figure 12C:
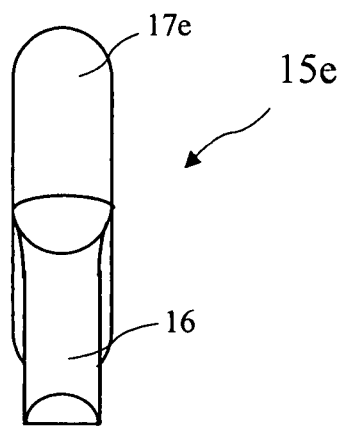
FIG. 12C is a top view of the fifth latch.

A front view of the latch 15e according to the present invention is shown in FIG. 12A, a side view of the latch 15e is shown in FIG. 12B, and a top view of the latch 15e is shown in FIG. 12C. The latch 15e preferably includes a latch ring 17e with an inner lip 46a and/or an outer lip 46b (see FIG. 10) which grasp the loop portion 12. The latch 15e is otherwise similar to the latch 15b (see FIGS. 4A-4C, and 5A-5C).

Figure 13:
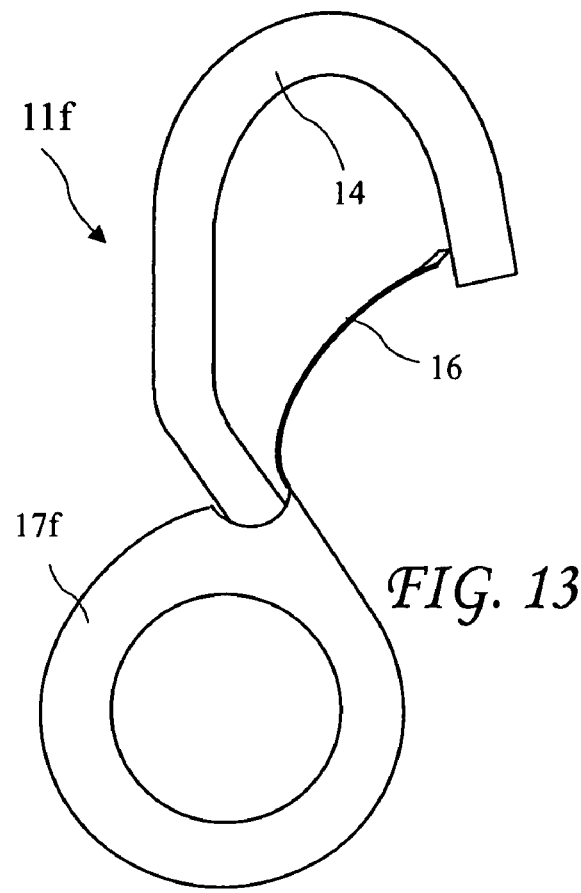
FIG. 13 shows a sixth safety hook and sixth latch according to the present invention.

A side view of a sixth safety hook 11f comprising the flat hook 10b and a sixth latch 15f (see FIGS. 14A-14C) according to the present invention is shown in FIG. 13. The latch 15f includes a sixth latch ring 17f residing on the side of the loop portion 12 with lips which cup the loop portion 12. The latch 12f is preferably formed by draw forming.

Figure 14A:
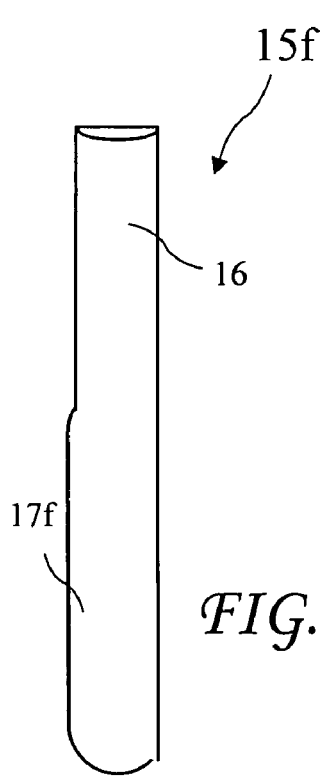
FIG. 14A is a front view of the sixth latch according to the present invention.
Figure 14B:
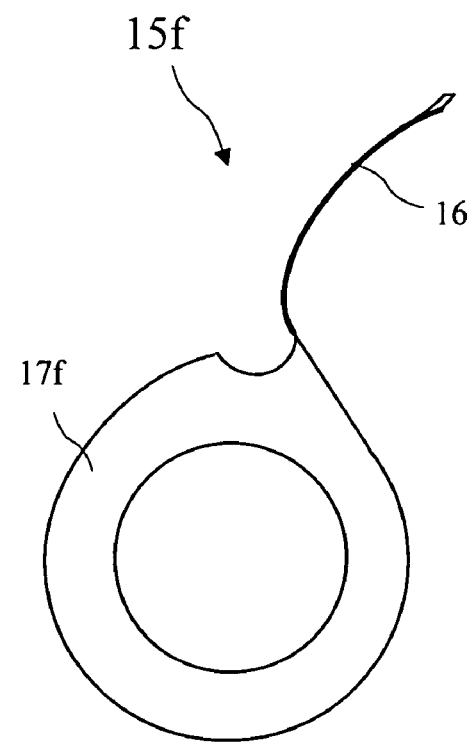
FIG. 14B is a side view of the sixth latch.
Figure 14C:
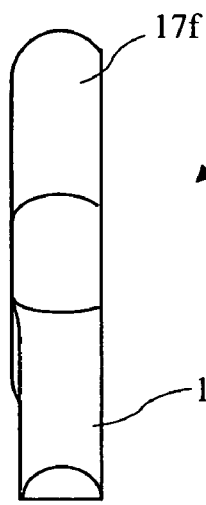
FIG. 14C is a top view of the sixth latch.

A front view of the latch 15f is shown in FIG. 14A, a side view of the latch 15f is shown in FIG. 14B, and a top view of the latch 15f is shown in FIG. 14C. The latch 15f preferably includes a latch ring 17f with an inner lip 46a and/or an outer lip 46b (see FIG. 10) which grasp the loop portion 12. The latch 15f is otherwise similar to the latch 15b (see FIGS. 6A-6C, and 7A-7C).

Figure 15A:
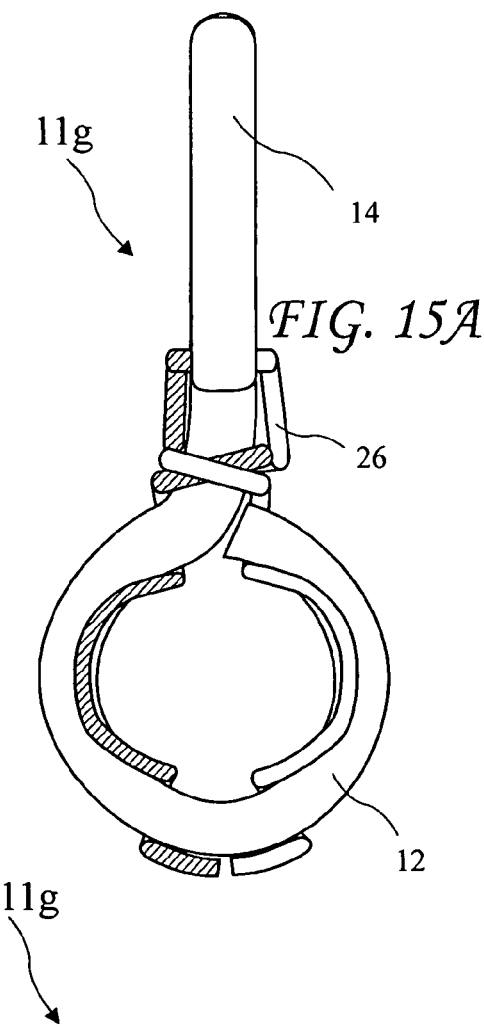
FIG. 15A is a front view of a seventh safety hook with a first wireform latch according to the present invention.
Figure 15B:
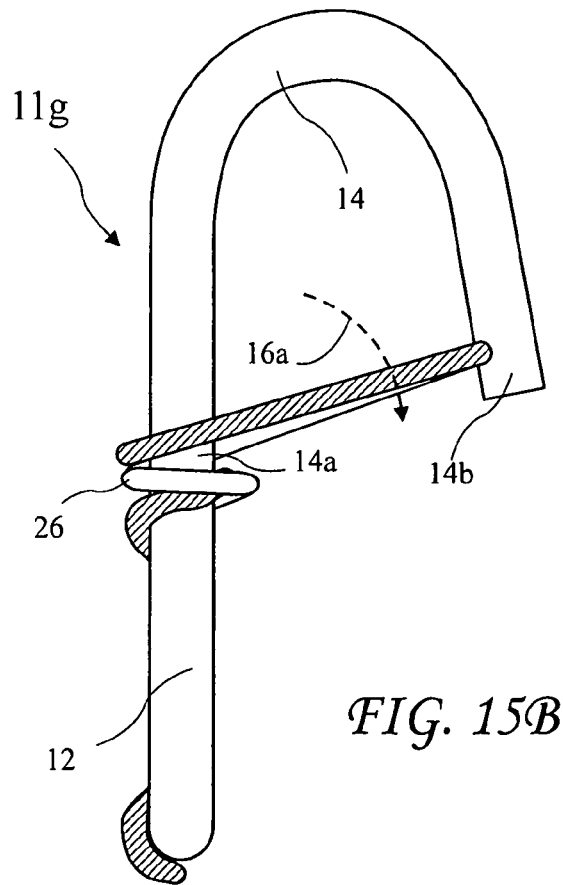
FIG. 15B is a side view of the seventh safety hook with the first wireform latch.
Figure 15C:
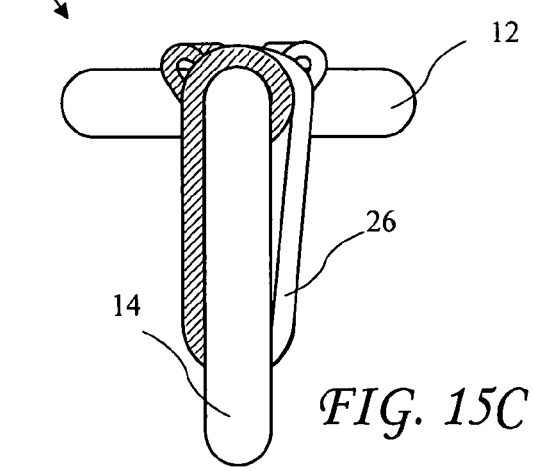
FIG. 15C is a top view of the seventh safety hook with the first wireform latch.
Figure 16A:
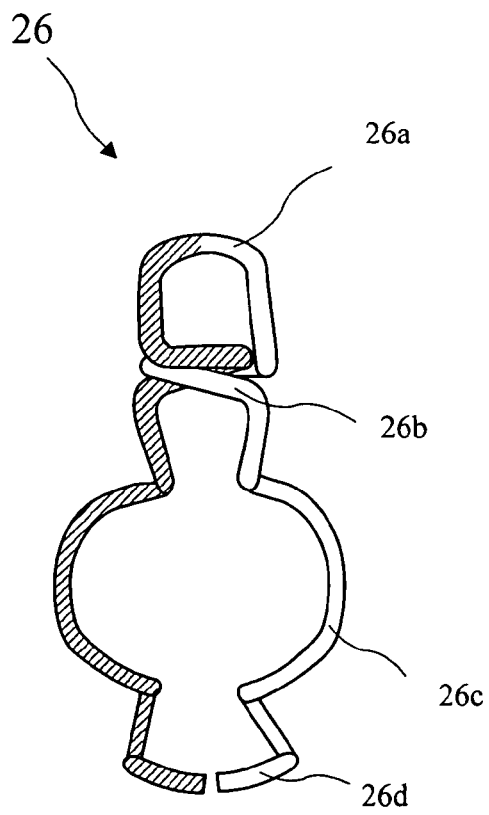
FIG. 16A is a front view of the first wireform latch according to the present invention.
Figure 16B:
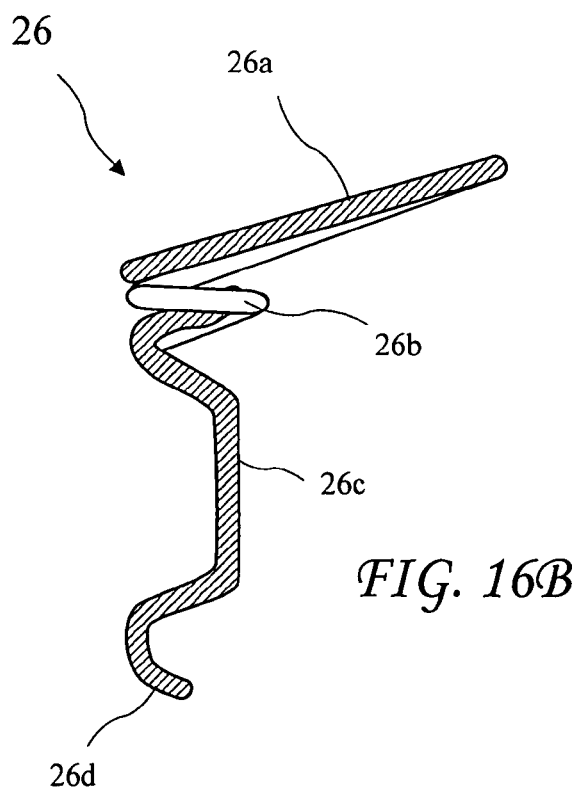
FIG. 16B is a side view of the first wireform latch.
Figure 16C:
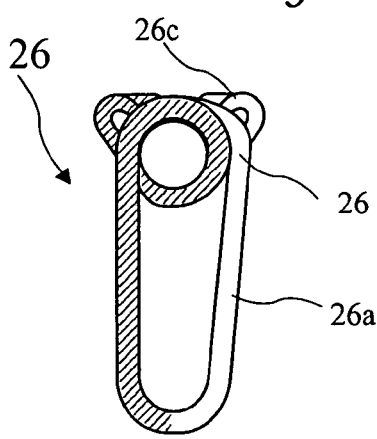
FIG. 16C is a top view of the first wireform latch.

A front view of a seventh safety hook 11g comprising the twisted hook 10a and a first wireform latch 26 (see FIGS. 16A-16C) according to the present invention is shown in FIG. 15A, a side view of the safety hook 11g with the wireform latch 26 is shown in FIG. 15B, and a top view of the safety hook 11g with the wireform latch 26 is shown in FIG. 15C. Further, to more clearly distinguish the wireform latch 26, a front view of the first wireform latch 26a alone is shown in FIG. 16B, a side view of the first wireform latch 26 alone is shown in FIG. 16B, and a top view of the wireform latch 26 alone is shown in FIG. 16C. The wireform latch 26 is shown half with a crosshatch pattern, and half with no pattern, to provide easier understanding of wireform shape. Each half is a contiguous span of the wire forming the wireform latch 26. The wireform latch 26 comprises a latch arm 26a, a latch wound portion 26b, loop grasping portions 26c, and strap graspable portions 26d. The latch arm 26a is biased in a closed position to prevent the hook and latch 11g from becoming unintentionally detached from a wheelchair 40 (see FIG. 33).

The latch arm 26a of the wireform latch preferably comprises an elongated "U" with open ends of the "U" connecting to the wound portion 26b. Each end of the "U" preferably connects to at least one wind of the wound portion 26b around the loop end 14a of the hook portion 14 of hook 10a.

The latch wound portion 26b winds around the hooked portion 14 of the hook just above the loop portion 12 to position the latch arm 26a. At least one contiguous span of the wireform 26 winds around the hooked portion 14, and preferably, both halves (the crosshatched and the half with no pattern) wind around the hooked portion 14 at least one time. The wireform latch 26 continues below the wound portion 26b to the loop grasping portions 26c which engage the interior of the loop portion 12 to position the wireform latch 26 with respect to the loop portion 12. The loop grasping portions 26c reach inside the loop portion 12 past center of the loop portion 12 and flares outwardly to allow the loop grasping portions 26c to snap into and remain positioned inside the loop portion 12. The wireform 26 continues down to the strap graspable portions 26d which lay against a base of the loop portion 12, wherein the strap graspable portions 26d may be grasped by strap 30 to further retain the wireform latch 26 on the first hook (see FIGS. 24A, 24B).

Figure 17A:
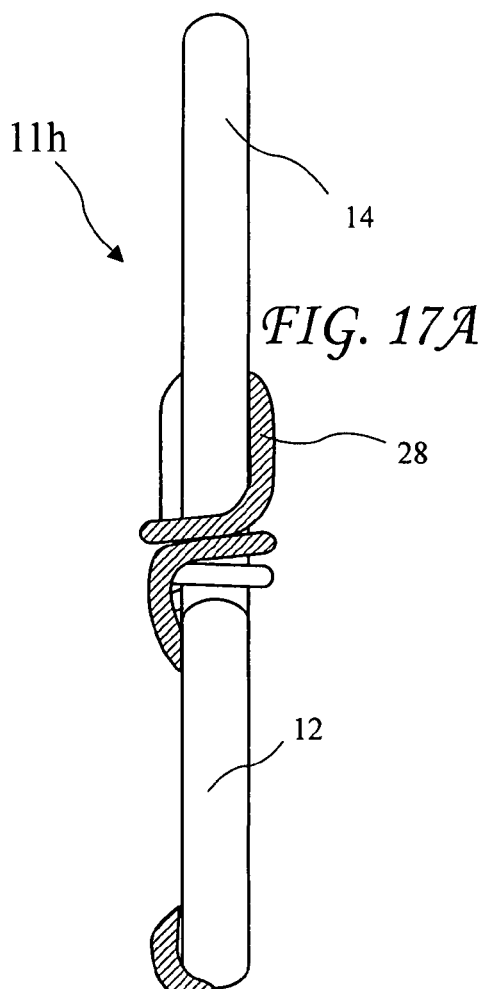
FIG. 17A is a front view of an eighth safety hook with a second wireform latch according to the present invention.
Figure 17B:
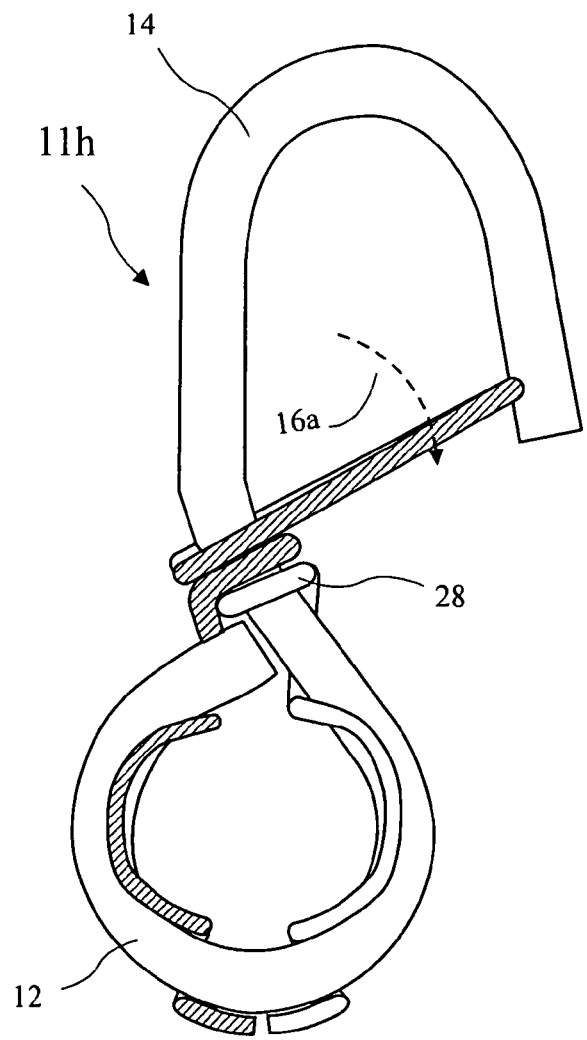
FIG. 17B is a side view of the eighth safety hook with the second wireform latch.
Figure 17C:
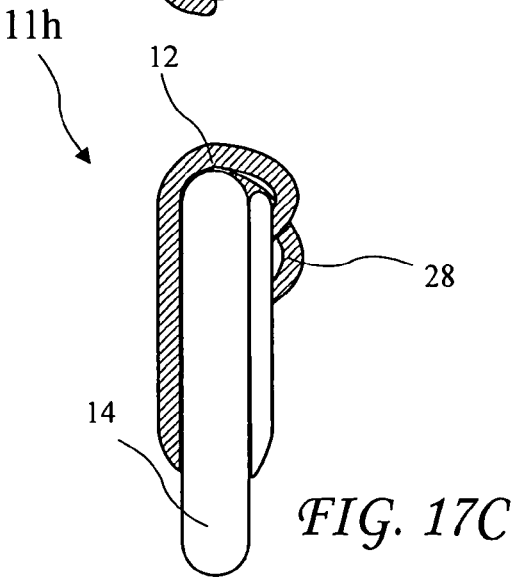
FIG. 17C is a top view of the eighth safety hook with the second wireform latch.
Figure 18A:
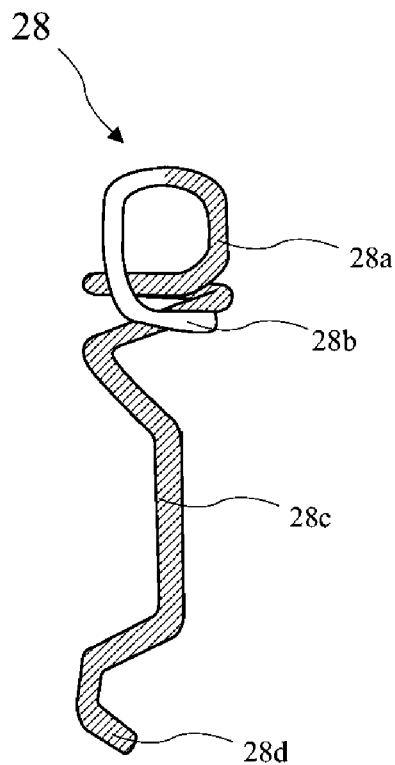
FIG. 18A is a front view of the second wireform latch according to the present invention.
Figure 18B:
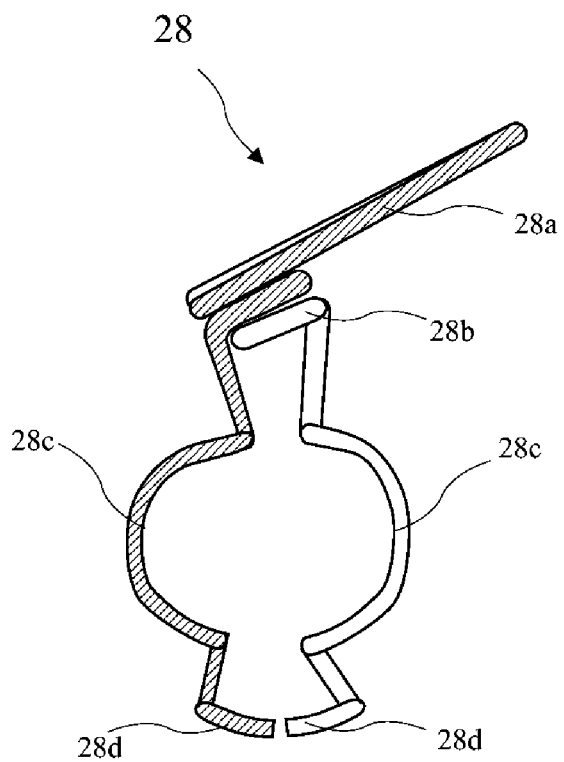
FIG. 18B is a side view of the second wireform latch.
Figure 18C:
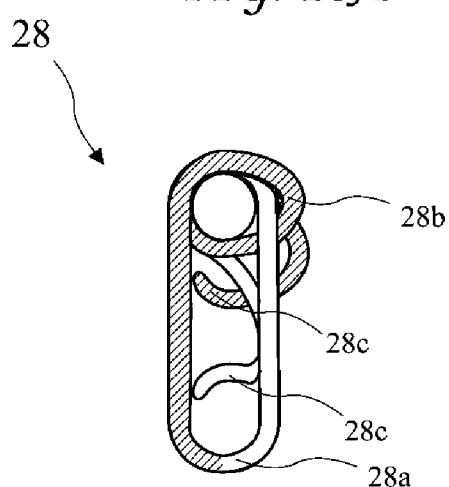
FIG. 18C is a top view of the second wireform latch.

A front view of an eighth safety hook 11h comprising the flat hook 10b with a second wireform latch 28 (see FIGS. 18A-18C) according to the present invention is shown in FIG. 17A, a side view of the safety hook 11h with the wireform latch 28 is shown in FIG. 17B, and a top view of the safety hook 11h with the wireform latch 28 is shown in FIG. 17C. Further, to more clearly distinguish the wireform latch 28, a front view of the second wireform latch 28 according to the present invention alone is shown in FIG. 18A, a side view of the second wireform latch 28 alone is shown in FIG. 18B, and a top view of the wireform latch 28 alone is shown in FIG. 18C. The wireform latch 28 is shown half with a crosshatch pattern, and half with no pattern, to provide easier understanding of wireform shape. Each half is a contiguous span of the wire forming the wireform latch 28. The wireform latch 28 comprises a latch arm 28a, a latch wound portion 28b, loop grasping portions 28c, and strap graspable portions 28d. The latch arm 28a is biased in a closed position to prevent the hook and latch 11h from becoming unintentionally detached from a wheelchair 40 (see FIG. 33).

The latch wound portion 28b winds around the hooked portion 14 of the hook just above the loop portion 12 to position the latch arm 28a on the hook 10b. At least one contiguous span of the wireform 28 winds around the hooked portion 14, and preferably, both halves (the crosshatched and the half with no pattern) wind around the hooked portion 14 at least one time. The wireform latch 28 continues below the wound portion 28b to the loop grasping portions 28c which engage the interior of the loop portion 12 to position the wireform latch 26 with respect to the loop portion 12. The loop grasping portions 28c reach inside the loop portion 12 past the center of the loop portion 12 and flare outwardly to allow the loop grasping portions 28c to snap into and remain positioned inside the loop portion 12. The wireform 28 continues down to the strap graspable portions 28d which lay against the base of the loop portion 12, wherein the strap graspable portions 28d may be grasped by strap 30 to further retain the wireform latch 28 on the first hook (see FIGS. 24A, 24B).

A side view of a ninth safety hook 11i according to the present invention comprising the twisted hook 10a with a ninth latch 15i and a first locking ring 31a (see FIGS. 20A-20D and 21) according to the present invention is shown in FIG. 19. The latch 15i includes a latch ring 17i residing on the rear of the loop portion 12 with lips 30 and 32 (see FIGS. 20A-21) which cup the loop portion 12. The locking ring 31a engages the latch ring 17i to lock the latch 15i in place on the hook 10a. The latch 15i and locking ring 31a are preferably formed by plastic.

A front view of the latch 15i is shown in FIG. 20A, a side view of the latch 15i is shown in FIG. 20B, and a top view of the latch 15i is shown in FIG. 20C. The latch 15i includes a latch ring 17i with an inner lip 30 and an outer lip 32 which grasp the loop portion 12. Preferably, the inner lip 30 reaches inside the loop portion 12 past center to grasp the loop portion 12, and the outer lip 32 preferably reaches approximately half way around the outside of the loop portion 12 to help position the latch 15i on the loop portion 12. A mouth 34 between the latch ring 17i and the latch arm 16 is provided to allow the latch 15i to be fitted over the hooked portion 14 of the hook 10a.

A front view of the locking ring 31a according to the present invention is shown in FIG. 20D. In addition to the inner lip 30 reaching past center to hold the latch 15i against the hook 10a, the locking ring 31a engages the inner lip 30 to hold the latch 15i in place.

A cross-sectional view of locking ring 31a and latch ring 17i taken along line 21-21 of FIG. 19 is shown in FIG. 21. The latch ring 17i includes ridges 33a and the locking ring 31a includes valleys 33b, which ridges and valleys cooperate to lock the locking ring 31a to the latch ring 17i. The ridges 33a and valleys 33b preferably reside on corresponding inner diameters of the locking ring 31a and the latch ring 17i, and the ridges 33a more preferably reside on the inner lip 30 of the latch ring 17i.

A side view of a tenth safety hook 11j according to the present invention comprising the flat hook 10b with a tenth latch 15j and a second locking ring 31b (see FIGS. 23A-23D) according to the present invention is shown in FIG. 22. The latch 15j includes a latch ring 17j residing on the side of the loop portion 12 with lips 30 and 32 (see FIGS. 20A-21) which cup the loop portion 12. The latch 15i is preferably formed from plastic.

A front view of the latch 15j is shown in FIG. 23A, a side view of the latch 15j is shown in FIG. 23B, and a top view of the latch 15j is shown in FIG. 23C. The latch 15j includes a latch ring 17j with an inner lip 30 and an outer lip 32 (see FIG. 21) which grasp the loop portion 12. Preferably, the inner lip 32 reaches inside the loop portion 12 past center to grasp the loop portion 12, and the outer lip 32 preferably reaches approximately half way around the outside of the loop portion 12 to help position the latch 15j on the loop portion 12. A mouth 34 between the latch ring 17j and the latch arm 16 is provided to allow the latch 15j to be fitted over the hooked portion 14 of the hook 10b.

A side view of the second locking ring 31b is shown in FIG. 23D. The third locking ring cooperates with the latch ring 17j to lock the latch 15j to the hook 10b in the manner described in FIG. 21.

Figure 25A:
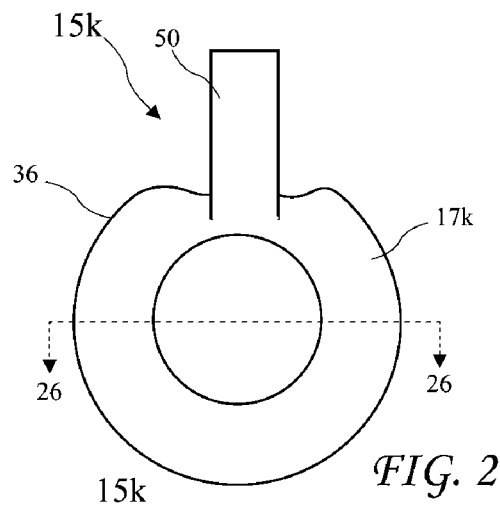
FIG. 25A is a front view of the first molded-in-place latch according to the present invention.
Figure 25B:
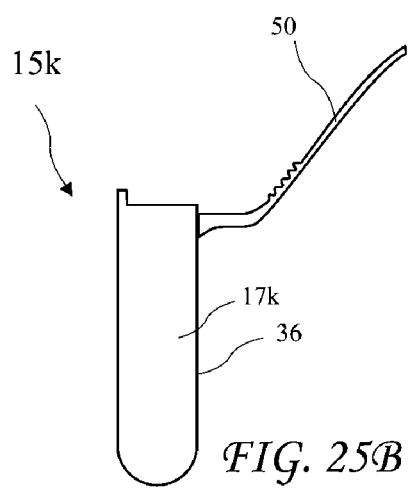
FIG. 25B is a side view of the first molded-in-place latch.
Figure 25C:
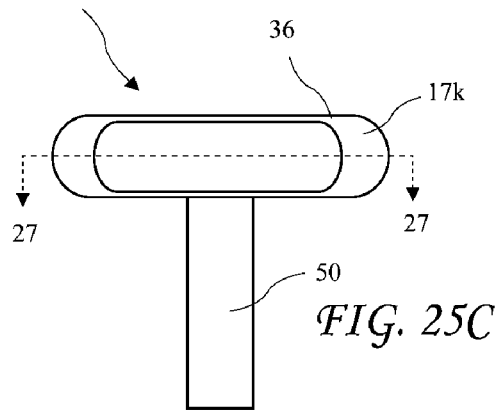
FIG. 25C is a top view of the first molded-in-place latch.
Figure 26:
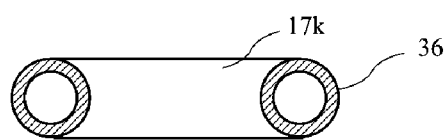
FIG. 26 is a cross-sectional view of the first molded-in-place latch taken along line 26-26 of FIG. 25A.
Figure 27:
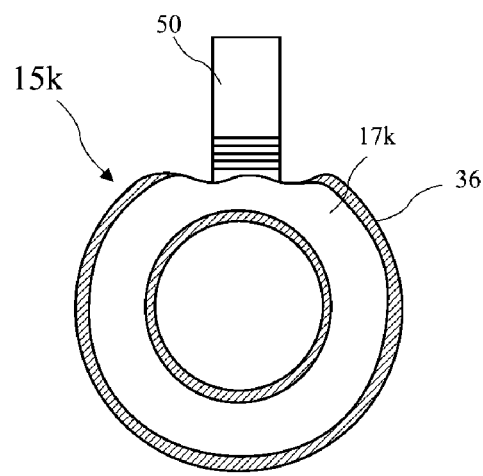
FIG. 27 is a cross-sectional view of the first molded-in-place latch taken along line 27-27 of FIG. 25C.

A front view of an eleventh safety hook 11k with a first molded-in-place latch 15k (see FIGS. 25A-27) according to the present invention is shown in FIG. 24A, a side view of the eleventh safety hook 11k is shown in FIG. 24B, and a top view of the eleventh safety hook 11k is shown in FIG. 24C. A front view of the first molded-in-place latch 15k according to the present invention alone is shown in FIG. 25A, a side view of the first molded-in-place latch 15k alone is shown in FIG. 25B, and a top view of the first molded-in-place latch 15k alone is shown in FIG. 25C. A cross-sectional view of the first molded-in-place latch 15k taken along line 26-26 of FIG. 25A is shown in FIG. 26 and a cross-sectional view of the first molded-in-place latch 15k taken along line 27-27 of FIG. 25C is shown in FIG. 27. The molded-in-place latch 15k is formed by molding over the loop portion 12 of the hook 10a (see FIGS. 1A-1C). Preferably, a small portion of the loop portion 12 proximal to the hooked portion 14 is left exposed. The molded-in-place latch 15k further includes a molded-in-place latch ring 17k which encloses and covers most of the loop portion 12 forming a toroidal shaped strap loop 31 having exterior 36, and a molded-in-place latch arm 50 biased along arc 50a to close the mouth 13 of the safety hook 11k. The molded-in-place latch ring 17k preferably encloses at least the entire bottom half of the loop portion 12 and extends onto the top half of the loop portion 12 sufficiently to provide support for the molded-in-place latch arm 50. The molded-in-place latch ring 17k more preferably encloses at least approximately 75% of the loop portion 12 and most preferably covers the entire inner radius of the loop portion 12. The molded-in-place latch 15k is preferably made from a durable plastic material, and is more preferably made from a Nylon material, and is most preferably made from Nylon 66 material.

A front view of a twelfth safety hook 11l with a second molded-in-place latch 15l according to the present invention is shown in FIG. 28A, a side view of the eleventh safety hook 11l is shown in FIG. 28B, and a top view of the eleventh safety hook 11l is shown in FIG. 28C. A front view of the first molded-in-place latch 15l according to the present invention alone is shown in FIG. 29A, a side view of the first molded-in-place latch 15l alone is shown in FIG. 29B, and a top view of the first molded-in-place latch 15l alone is shown in FIG. 29C. A cross-sectional view of the first molded-in-place latch 15l taken along line 30-30 of FIG. 29A is shown in FIG. 30 and a cross-sectional view of the first molded-in-place latch 15l taken along line 31-31 of FIG. 29C is shown in FIG. 31. The molded-in-place latch 15l is formed by molding over the loop portion 12 of the hook 10b (see FIGS. 1D-1F). The molded-in-place latch 15l further includes a molded-in-place latch ring 17l and the molded-in-place latch arm 50 biased along arc 50a to close the mouth 13 of the safety hook 11l. The molded-in-place latch 15l is preferably made from a durable plastic material, and is more preferably made from a Nylon material, and is most preferably made from Nylon 66 material. Most or all of the hooked portion 14 of the eleventh safety hook 11/k and the twelfth safety hook 11/is exposed, i.e., not covered by the respective molded-in-place latch.

Figure 32A:
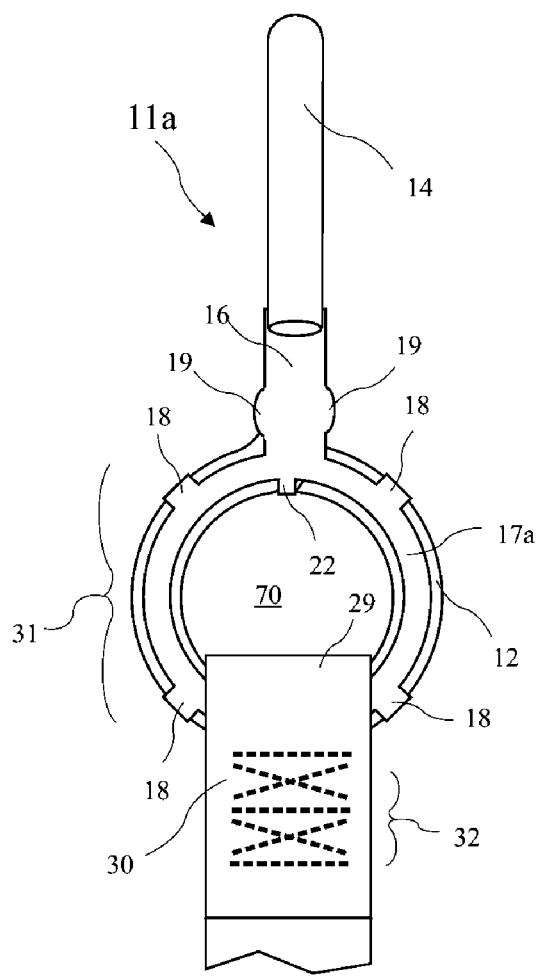
FIG. 32A is a front view of a strap attached to a safety hook according to the present invention.
Figure 32B:
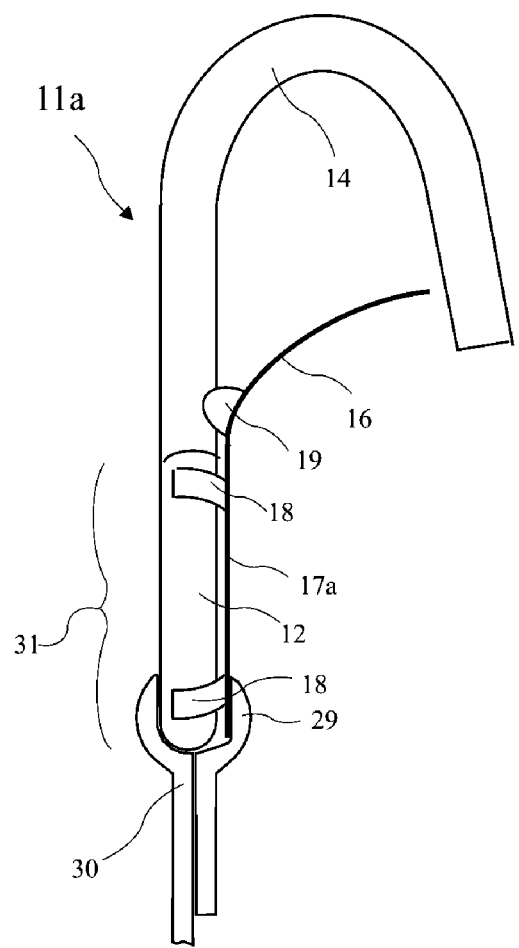
FIG. 32B is a side view of a strap attached to the safety hook.

A front view of a strap 30 attached to the hook and latch 11a is shown in FIG. 32A, and a side view of a strap 30 attached to the hook and latch 11a is shown in FIG. 32B. The strap 30 passes through a strap mouth 70 formed by the loop portion 12 and the latch ring 17a and back attaching to the strap 30, thus holding the latch ring 17a (see FIGS. 3A, 3B, and 3C) against the loop portion 12.

The strap 30 is preferably permanently attached to the hook and latch 11a by stitching 32 which resides close to strap loop 31, and is preferably sewn using pressure foot sewing. The strap is similarly attached to the safety hooks 11b-11j to closely hold the latch ring against the strap loop 31. Because reliable retention of the latch 15a-15j is important to the safe use of the safety hook 11a-11j, looping the strap 30 around the strap loop 31 and latch ring is an important feature of the safety hook.

A side view of a wheel chair 40 connected to a vehicle floor 44 using the safety hook 11a of the present invention is shown in FIG. 33. The strap 30 attaches to, for example, a track fitting 42 attached to the floor 44. The track fitting 42 is preferably a quick disconnect track fitting. The opposite end of the strap 30 is connected to the wheel chair 40 by the safety hook 11a. The strap includes a tensioning buckle to tighten the strap after attaching to the wheel chair 40. Thus, motion of the vehicle, and resulting slack in the strap 30, does not result in the hook falling off the wheel chair 40 or any other attachment point.

Assembly of the seventh through tenth safety hooks (11g-11j) comprises passing the hooked portion 14 of the hook 10a or 10b through the wound portions 26b and 28b or the mouth 34 (see FIGS. 16A, 18A, 20A and 23A) and then rotating the latch to engage the loop portion 12.

Various embodiments of the latch of the present invention are described herein as including finger or other portions which extend "past center" on the loop portion 12. In the present application, the term "past center" is meant to mean that the finger, etc. reach more than 90 degrees from a face of the strap loop and that such reaching holds the latch against the strap loop so that the finger etc. must be displaced to remove the latch from the strap loop.

While the invention herein disclosed has been described by means of specific embodiments and applications thereof, numerous modifications and variations could be made thereto by those skilled in the art without departing from the scope of the invention set forth in the claims.

I claim:

1. A safety hook comprising:
   a hook comprising:
      a loop portion forming a circle and a strap mouth inside the circle; and
      a hooked portion having:
         a loop end extending from the loop portion;
         a mouth end opposite the loop end and having an inner face facing the loop end; and
         a hook mouth between the loop end and the mouth end, the hook mouth for attaching the hook to an object;
   a plastic molded-in-place latch comprising:
      a latch ring molded over the loop portion and forming a toroidal shaped strap loop having a toroidal shaped exterior surface and a strap mouth through the center of the toroidal shape circling around the strap mouth of the loop portion; and
      a latch arm extending from the latch ring from below the loop end of the hooked portion of the hook and upward into the hook mouth towards the mouth end of the hooked portion and biased to reside against the inner face of the mouth end, the latch arm for retaining the hook on the object; and
   a strap reaching around the outer surface of the toroidal shape exterior of the strap loop and through the strap mouth and circling both the loop portion and the latch ring and looping back to the strap and attached thereto to secure the strap to the safety hook, wherein most of the hooked portion of the hook is exposed and not over molded.

2. The safety hook of claim 1, wherein:
   the latch arm is biased along a first arc to a biased position proximal to the inner face;
   the latch arm being depressible opposite the first arc to allow the hooked portion to engage a vehicle hold-down; and
   the latch arm returns to the biased position when released.

3. The safety hook of claim 2, wherein:
   the latch is one piece, plastic, and molded-in-place; and
   the latch ring is molded-in-place over the loop portion completely covering at least a bottom half of the loop portion and leaving at least a portion of the hooked portion exposed.

4. The safety hook of claim 3, wherein the molded-in-place latch ring covers at least 75% of the loop portion.

5. The safety hook of claim 4, wherein the molded-in-place latch ring completely covers an inside radius of the loop portion.

6. The safety hook of claim 1, wherein the strap is exposed and free to slide on the toroidal shaped exterior surface of the strap loop.

7. A safety hook comprising:
   a hook comprising:
      a loop portion; and
      a hooked portion having:
         a loop end extending from the loop portion;
         a mouth end opposite the loop end and having an inner face facing the loop end; and
         a hook mouth between the loop end and the mouth end, the hook mouth for attaching the hook to an object; and
   a plastic molded-in-place latch comprising:
      a molded-in-place latch ring molded around the loop portion forming a toroidal shaped strap loop having a toroidal shaped exterior surface and a strap mouth through the center of the toroidal shape, the latch ring enclosing and covering at least approximately 75% of the loop portion;
      a molded-in-place latch arm extending from the molded-in-place latch ring towards the mouth end of the hooked portion and biased towards the inner face of the mouth end, the latch arm for retaining the hooked portion on the object; and
   a strap reaching through the interior of the toroidal shaped strap loop and outside the toroidal shaped exterior surface of the strap loop, and holding the latch ring against the loop portion and looping back to the strap and attached thereto to secure the strap to the safety hook, the strap free to slide on the toroidal shaped exterior surface of the strap loop, wherein most of the hooked portion of the hook is exposed and not over molded.

8. The safety hook of claim 7, wherein the hooked portion is twisted 90 degrees from the loop portion.

9. The safety hook of claim 7, wherein molded-in-place latch is made from Nylon material.

10. The safety hook of claim 7, wherein a small portion of the loop portion proximal to the hooked portion is left exposed.

11. The safety hook of claim 7, wherein the molded-in-place latch ring and the molded-in-place latch arm are a single molding.

12. The safety hook of claim 7, wherein the molded-in-place latch ring encloses at least the entire bottom half of the loop portion and extends onto the top half of the loop portion sufficiently to provide support for the molded-in-place latch arm.

* * * * *